(12) United States Patent
Anderson et al.

(10) Patent No.: US 8,923,178 B2
(45) Date of Patent: *Dec. 30, 2014

(54) MANAGING GROUP MESSAGES FOR LTE WAKEUP

(75) Inventors: Nicholas William Anderson, Bristol (GB); Gordon Peter Young, Shipston-on-Stour (GB); Richard Charles Burbidge, Hook (GB); William Daniel Willey, Morgan Hill, CA (US); Takashi Suzuki, Ichikawa (JP)

(73) Assignee: BlackBerry Limited, Waterloo, Ontario (CA)

( * ) Notice: Subject to any disclaimer, the term of this patent is extended or adjusted under 35 U.S.C. 154(b) by 383 days.

This patent is subject to a terminal disclaimer.

(21) Appl. No.: 13/458,189

(22) Filed: Apr. 27, 2012

(65) Prior Publication Data

US 2012/0275364 A1 Nov. 1, 2012

Related U.S. Application Data

(60) Provisional application No. 61/481,105, filed on Apr. 29, 2011.

(51) Int. Cl.
*H04W 72/04* (2009.01)
*H04W 52/02* (2009.01)
*H04W 68/02* (2009.01)
*H04W 8/18* (2009.01)

(52) U.S. Cl.
CPC ...... *H04W 52/0219* (2013.01); *H04W 52/0222* (2013.01); *H04W 68/025* (2013.01); *H04W 8/186* (2013.01)
USPC ............................ 370/311; 370/329; 370/252

(58) Field of Classification Search
CPC ..... H04L 5/0053; H04L 5/0007; H04L 5/001; H04L 5/0094; H04L 5/0098; H04W 52/0216; H04W 72/042; H04W 72/1289; H04W 52/0219; H04W 74/002
USPC ........ 370/329, 311, 252, 331; 455/458, 422.1
See application file for complete search history.

(56) References Cited

U.S. PATENT DOCUMENTS

| | | | |
|---|---|---|---|
| 2007/0259675 A1* | 11/2007 | Worrall | 455/458 |
| 2009/0122736 A1 | 5/2009 | Damnjanovic et al. | |
| 2009/0135755 A1 | 5/2009 | Qi et al. | |
| 2009/0143072 A1 | 6/2009 | Montojo et al. | |
| 2009/0207794 A1 | 8/2009 | Meylan | |
| 2009/0221289 A1 | 9/2009 | Xu et al. | |

(Continued)

OTHER PUBLICATIONS

Office Action issued in U.S. Appl. No. 13/458,338 on Mar. 24, 2014, 15 pages.

(Continued)

*Primary Examiner* — Dang Ton
*Assistant Examiner* — Sai Aung
(74) *Attorney, Agent, or Firm* — Fish & Richardson P.C.

(57) ABSTRACT

In some implementations, a method for managing a receiver for user equipment in a Long Term Evolution (LTE) system includes receiving, within a Physical Downlink Control Channel (PDCCH) resource region of a first sub-frame, a message addressed to an Identifier (ID) associated with a group of UEs. The message contains wake-up indicators for more than one of the UEs within the group of UEs. Based on the message, at least a portion of a second sub-frame is received. The second sub-frame occurs at a different time than the first sub-frame.

38 Claims, 20 Drawing Sheets

(56) References Cited

U.S. PATENT DOCUMENTS

| | | | |
|---|---|---|---|
| 2009/0264164 A1 | 10/2009 | Chun et al. | |
| 2010/0081451 A1 | 4/2010 | Mueck et al. | |
| 2010/0128646 A1 | 5/2010 | Gao | |
| 2010/0135159 A1 | 6/2010 | Chun et al. | |
| 2010/0172250 A1 | 7/2010 | Chun et al. | |
| 2010/0202382 A1* | 8/2010 | Park et al. | 370/329 |
| 2010/0248750 A1* | 9/2010 | Muller et al. | 455/458 |
| 2010/0272037 A1 | 10/2010 | Lee et al. | |
| 2011/0002281 A1* | 1/2011 | Terry et al. | 370/329 |
| 2011/0021154 A1 | 1/2011 | Marinier et al. | |
| 2011/0026449 A1* | 2/2011 | Kuo | 370/311 |
| 2011/0064037 A1* | 3/2011 | Wei et al. | 370/329 |
| 2011/0085506 A1 | 4/2011 | Lee et al. | |
| 2011/0092240 A1 | 4/2011 | Aiba et al. | |
| 2011/0176513 A1* | 7/2011 | Yi et al. | 370/331 |
| 2011/0201361 A1 | 8/2011 | Montojo et al. | |
| 2011/0268032 A1 | 11/2011 | Kim et al. | |
| 2012/0033627 A1* | 2/2012 | Li et al. | 370/329 |
| 2012/0155561 A1 | 6/2012 | Seo et al. | |
| 2013/0010720 A1* | 1/2013 | Lohr et al. | 370/329 |
| 2013/0194995 A1* | 8/2013 | Reinhardt et al. | 370/311 |

OTHER PUBLICATIONS

IPWireless, NextWave Wireless; "Paging Group Indication"; 3GPP TSG RAN WG2#59bis (R2-074187); Shanghai, China; Oct. 8-12, 2007; 4 pages.

NEC; "Need for Paging Group"; 3GPP TSG-RAN WG2#59 (R2-073095); Athens, Greece; Aug. 20-24, 2007; 3 pages.

NTT DoCoMo, Inc.; "Signalling Optimized DL Scheduling for LTE"; 3GPP TSG-RAN WG2 Meeting #56bis (R2-070272); Sorrento, Italy; Jan. 15-19, 2007; 4 pages.

Qualcomm Europe; "PDCCH Format for Paging"; 3GPP TSG-RAN WG1 #52bis (R1-081480); Shenzhen, China; Mar. 31-Apr. 4, 2008; 3 pages.

International Search Report and Written Opinion of the International Searching Authority issued in International Application No. PCT/US2012/035460 on Jul. 12, 2012; 9 pages.

"3rd Generation Partnership Project; Technical Specification Group Radio Access Network; Evolved Universal Terrestrial Radio Access (E-UTRA); Physical Layer Procedures (Release 10)"; 3GPP TS 36.213 V10.10.; Mar. 30, 2011; 115 pages.

International Search Report and Written Opinion of the International Searching Authority issued in International Application No. PCT/US2012/035456 on Jul. 30, 2012; 11 pages.

International Search Report and Written Opinion of the International Searching Authority issued in International Application No. PCT/US2012/035459 on Jul. 26, 2012; 10 pages.

International Preliminary Report on Patentability under Chapter I issued in International Application No. PCT/US2012/035460 on Nov. 7, 2013; 7 pages.

International Preliminary Report on Patentability under Chapter I issued in International Application No. PCT/US2012/035456 on Nov. 7, 2013; 7 pages.

International Preliminary Report on Patentability under Chapter I issued in International Application No. PCT/US2012/035459 on Nov. 7, 2013; 7 pages.

Office Action issued in U.S. Appl. No. 13/458,338 on Nov. 26, 2013, 16 pages.

Communication Pursuant to Article 94(3) EPC issued in European Applicaton No. 12720745.4 on Aug. 8, 2014; 3 pages.

Office Action issued in U.S. Appl. No. 13/458,226 on Jul. 21, 2014.

* cited by examiner

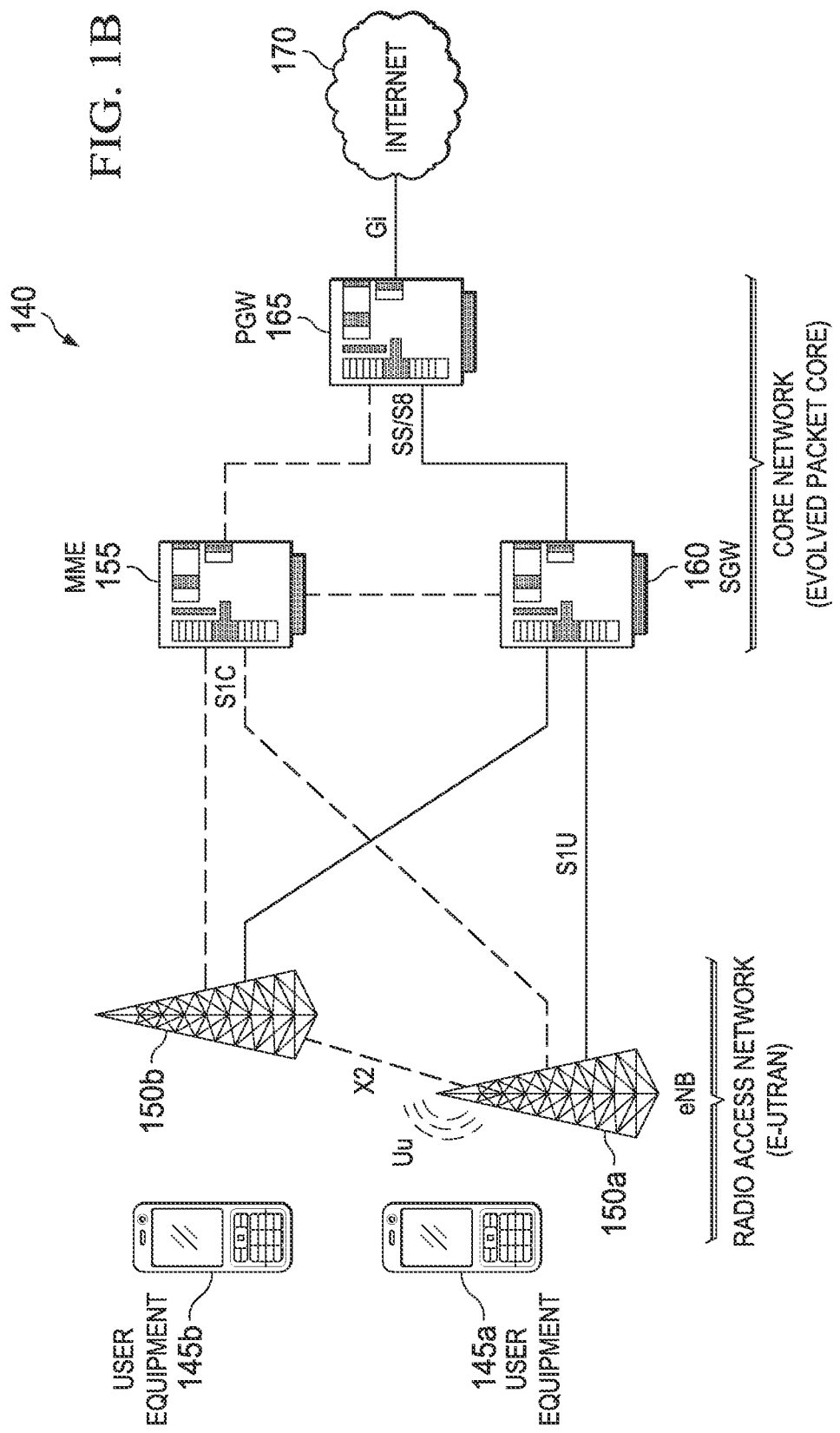

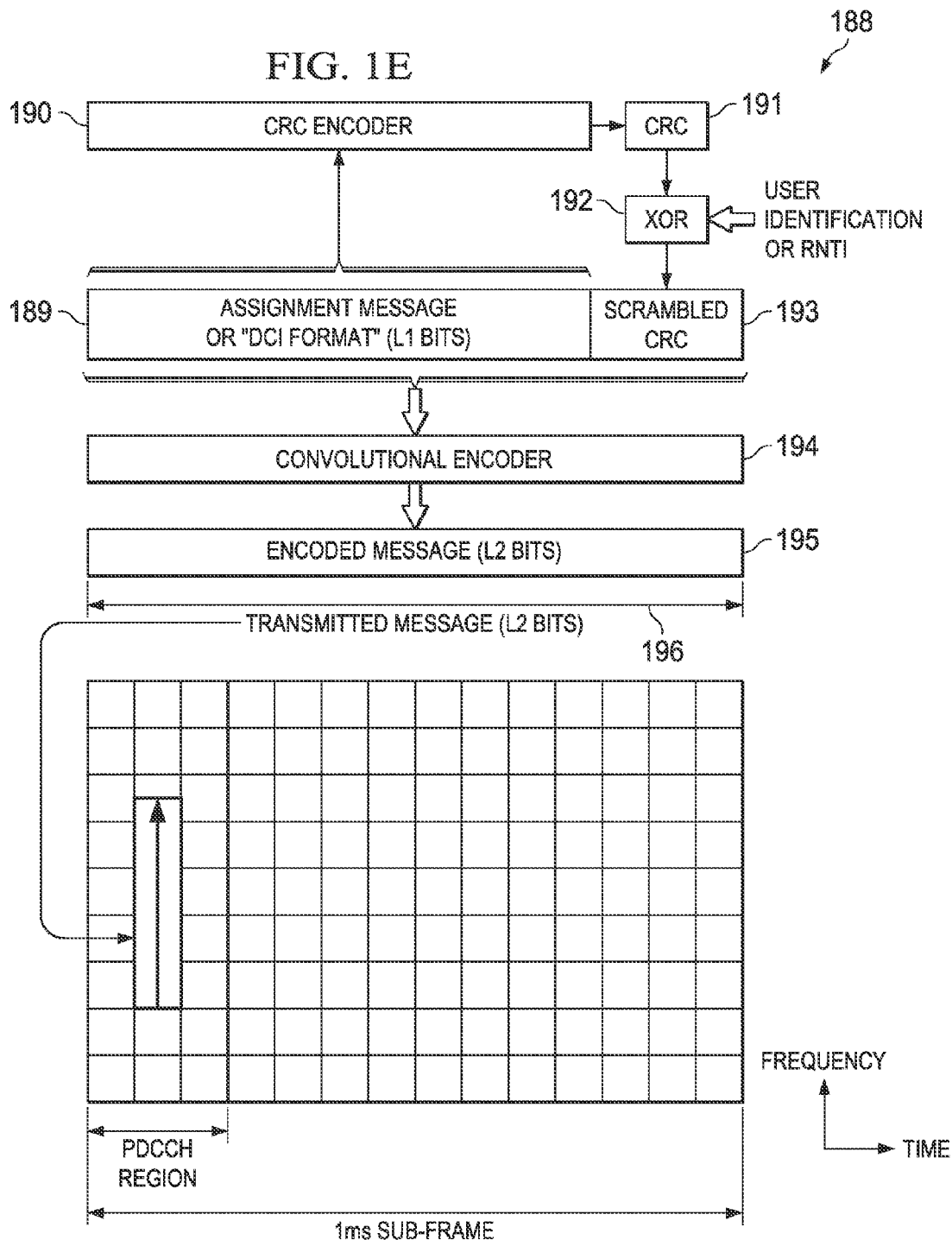

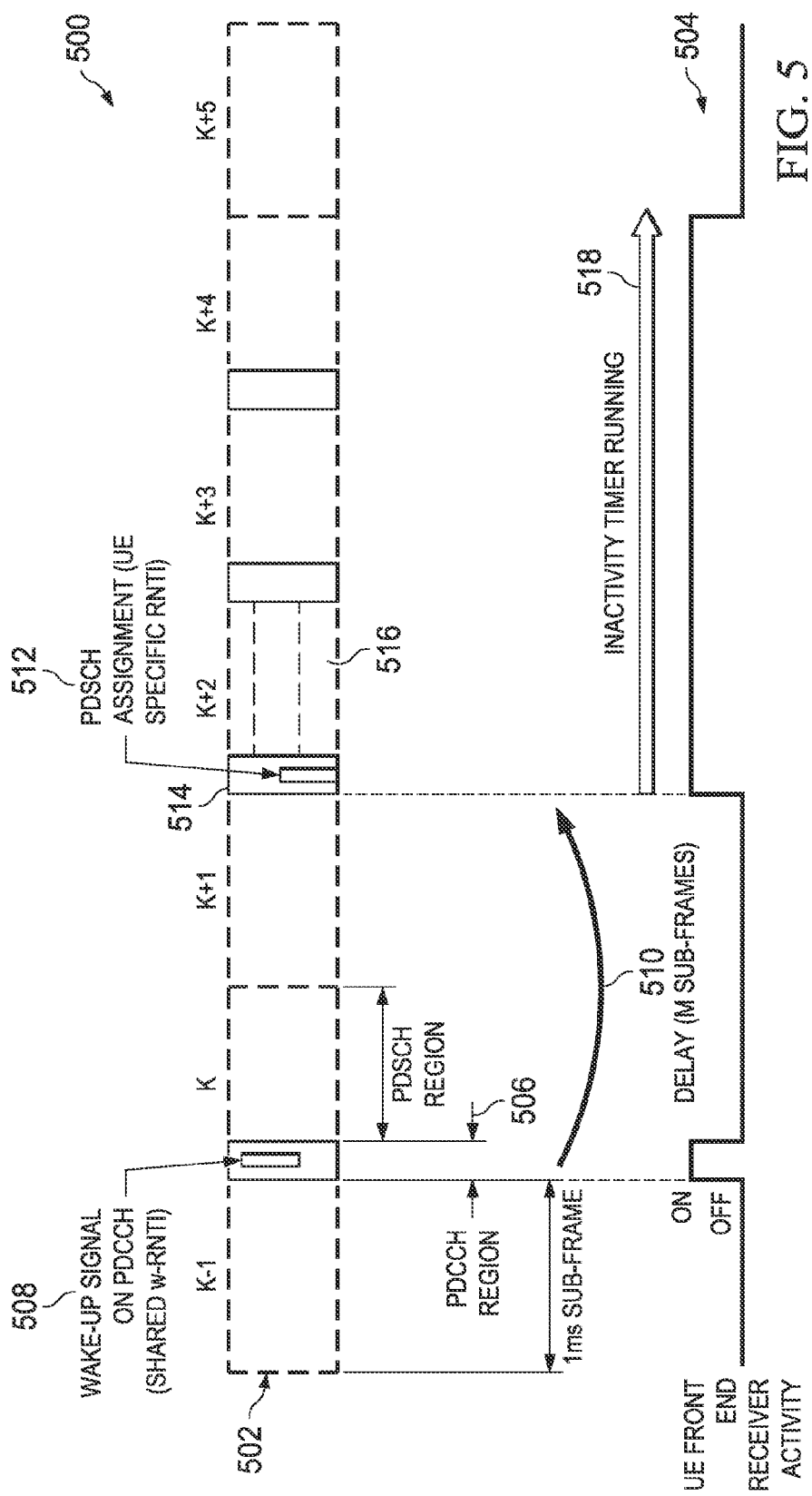

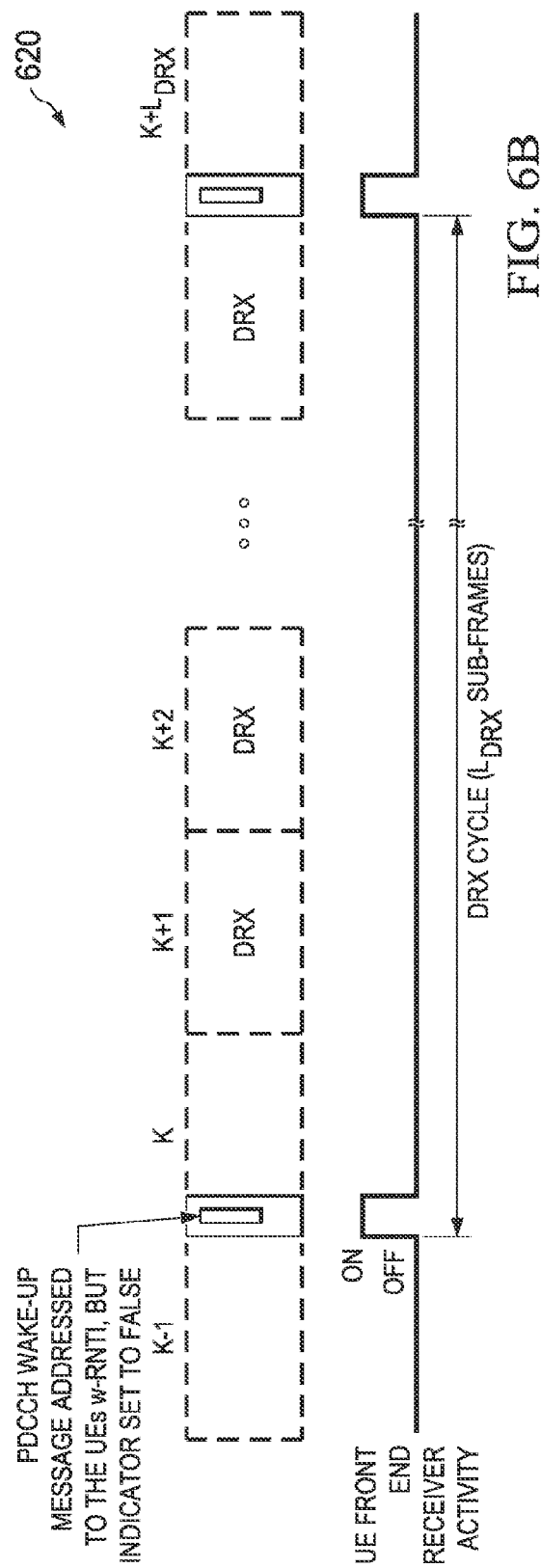

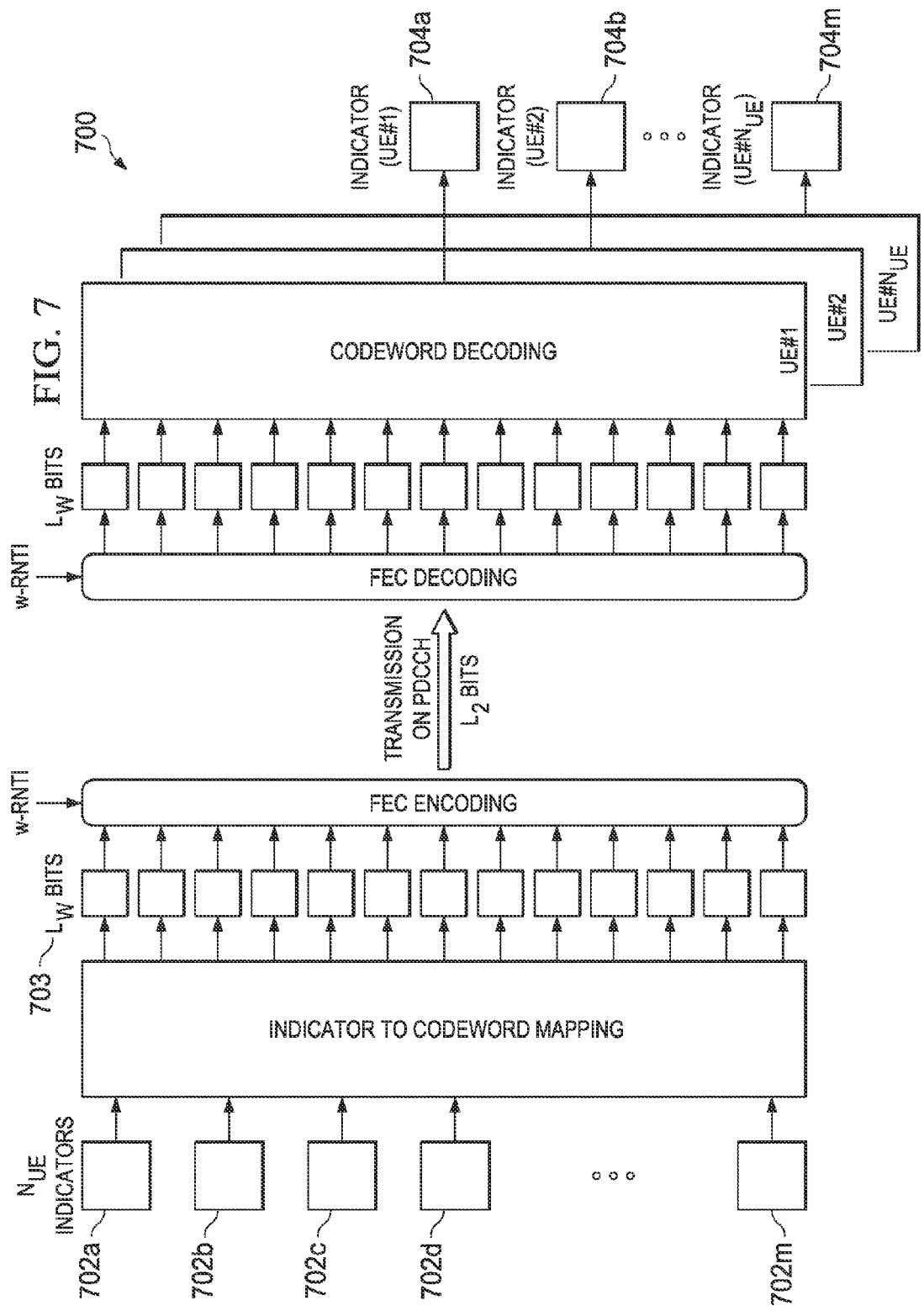

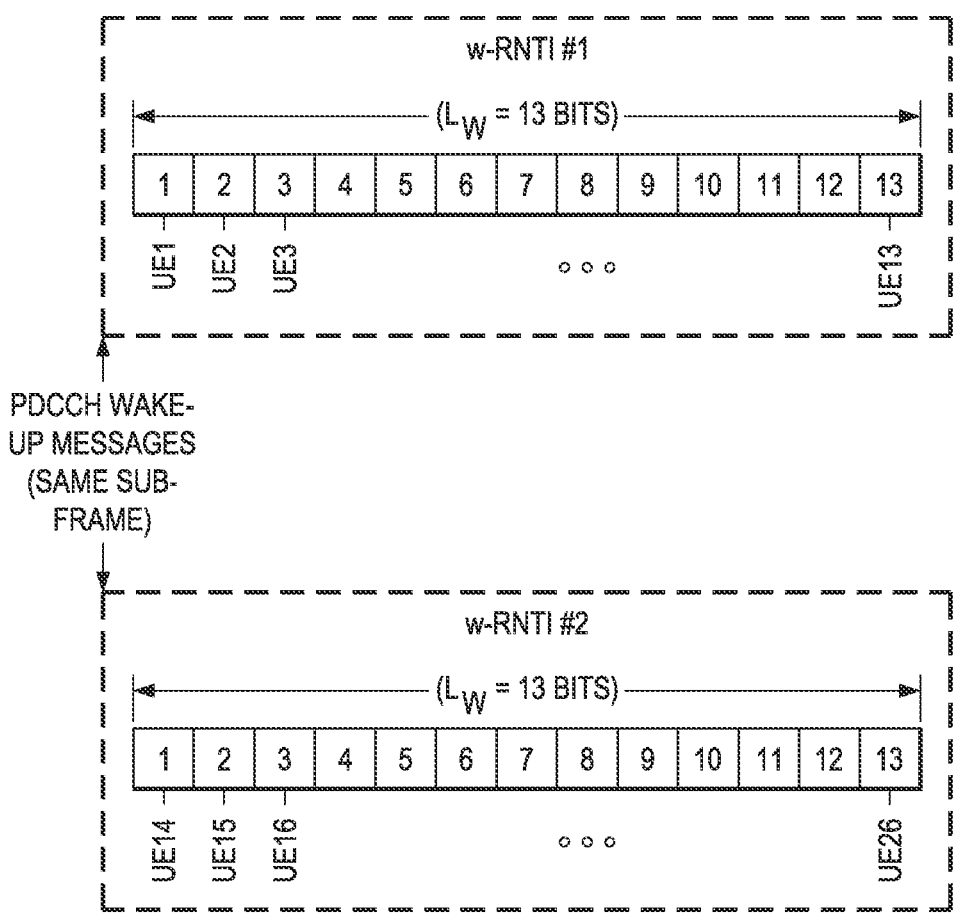

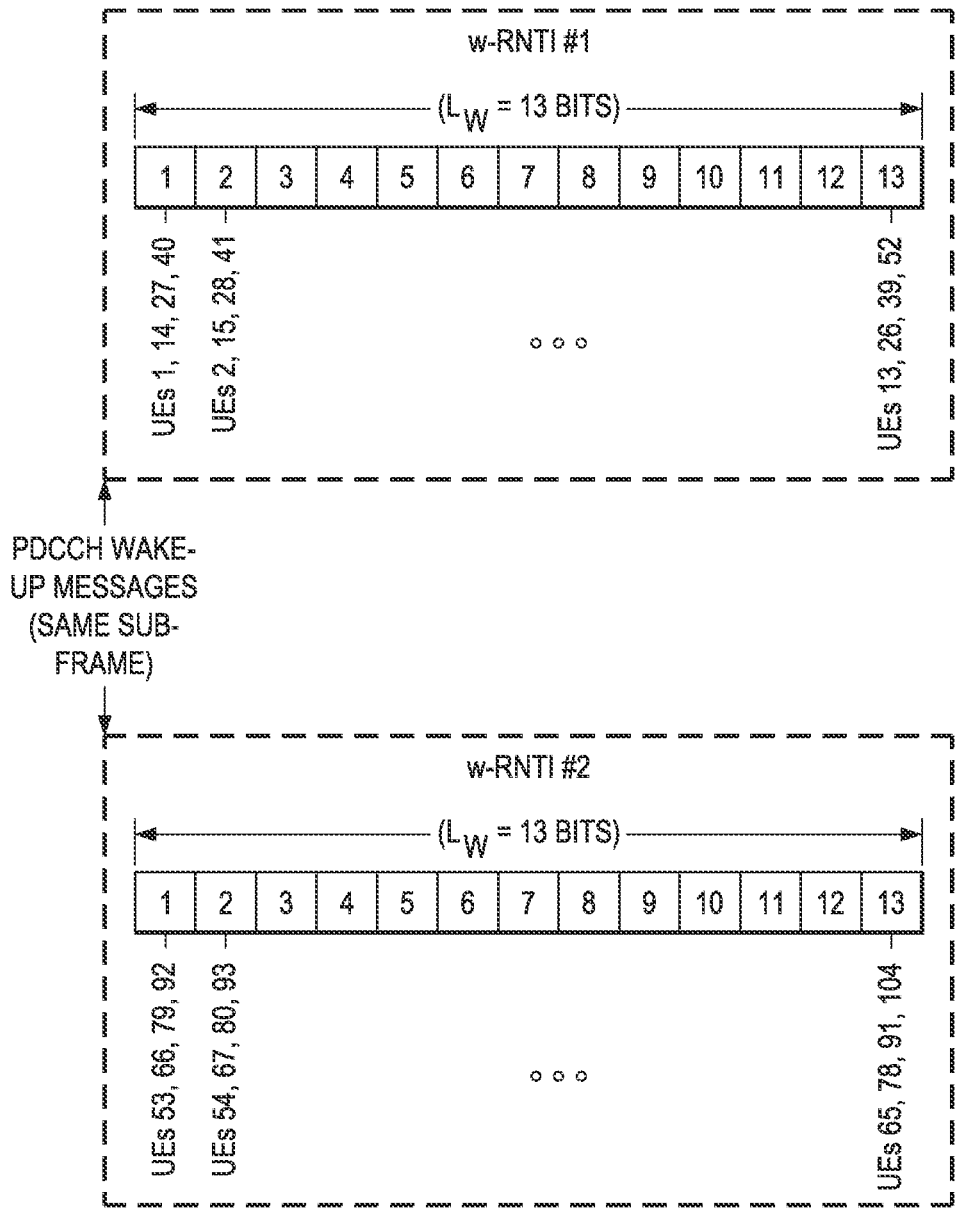

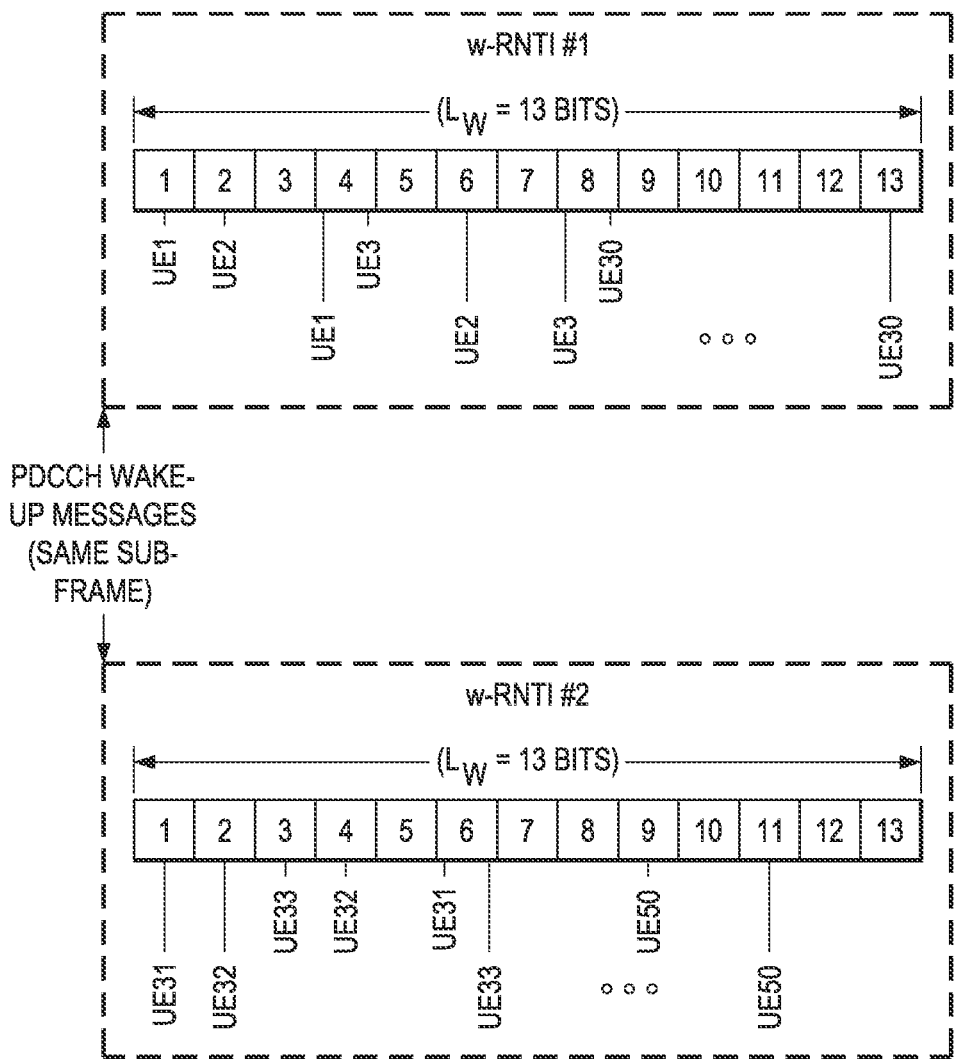

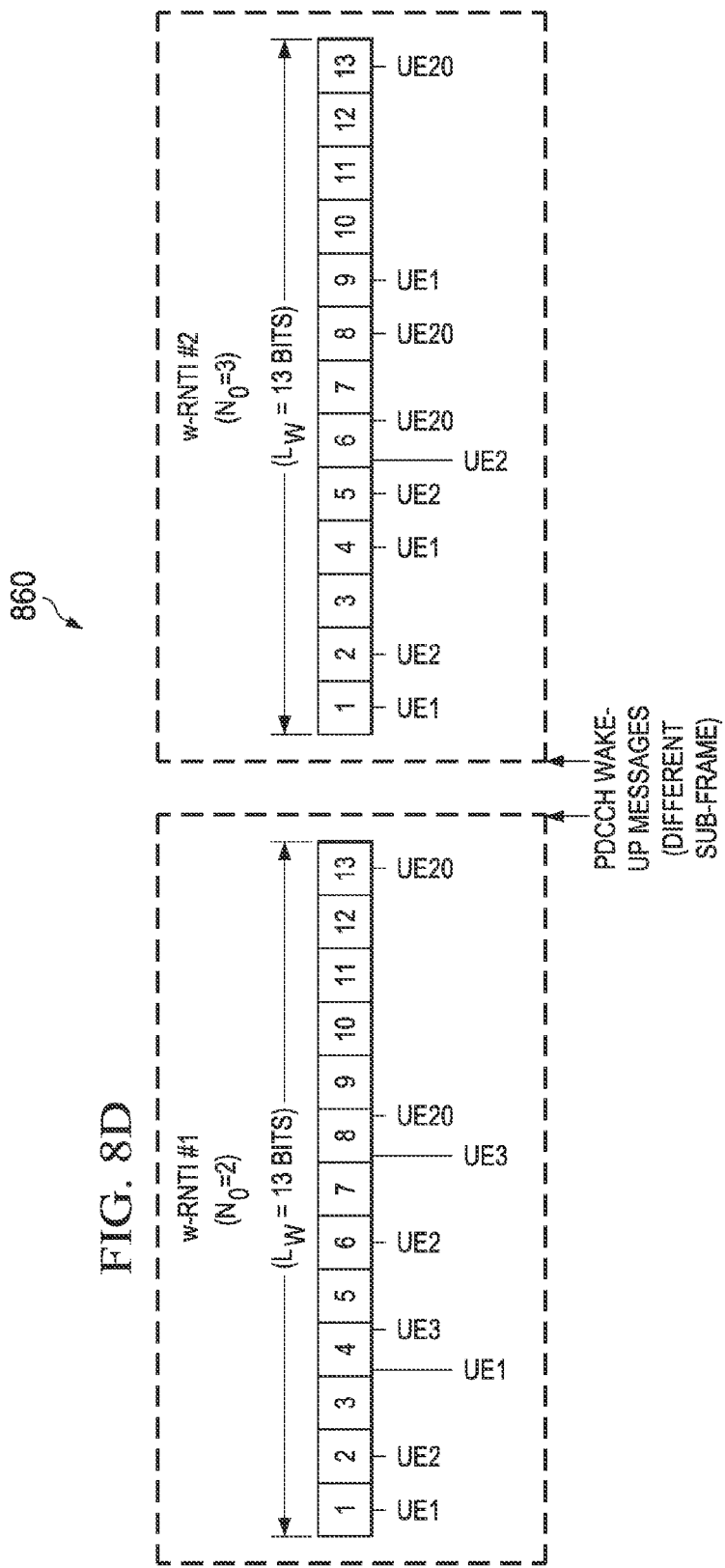

MANAGING GROUP MESSAGES FOR LTE WAKEUP

CLAIM OF PRIORITY

This application claims priority under 35 U.S.C. §119(e) to U.S. Provisional Patent Application Ser. No. 61/481,105, filed on Apr. 29, 2011, the entire contents of which are hereby incorporated by reference.

BACKGROUND

This document relates to wireless communications in wireless communication systems.

As used herein, the terms "user equipment" and "UE" can refer to wireless devices such as mobile telephones, personal digital assistants (PDAs), handheld or laptop computers, and similar devices or other User Agents ("UA") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment result in an LTE advanced (LTE-A) system. As used herein, the phrase "base station" will refer to any component or network node, such as a traditional base station or an LTE or LTE-A base station (including eNBs), that can provide a UE with access to other components in a telecommunications system.

In mobile communication systems such as E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. To facilitate communications, a plurality of different communication channels may be established between a base station and a UE. The scheduler dynamically allocates resources for Physical Downlink Shared CHannel (PDSCH) and Physical Uplink Shared CHannel (PUSCH) data transmissions, and sends scheduling information to the UEs through a Physical Downlink Control CHannel (PDCCH).

As the label implies, the PDCCH is a downlink channel that allows the base station to control a UE during data communications. To this end, the PDCCH is used to transmit control information within control data packets referred to as Downlink Control Information (DCI) messages. The control information conveyed within DCI messages may be used to transmit uplink or downlink scheduling assignments (for PUSCH and PDSCH respectively) or to convey other control information. The control information may be directed towards or addressed to one UE, a group of UEs, or all UEs within the cell. Downlink scheduling assignments may be sent to a UE to indicate to the UE parameters related to the formatting of a forthcoming transmission of downlink communication traffic packets by the base station on a Physical Downlink Shared Channel (PDSCH) and to indicate the location of the physical resources to be used for that transmission. Uplink scheduling assignments may be sent to a UE to indicate parameters related to a forthcoming transmission of uplink communication traffic packets by the UE on a Physical Uplink Shared Channel (PUSCH) and to indicate the location of the physical resources on which the transmission may take place. DCI messages may also convey other types of control information or provide specific instructions to the UE (e.g., power control commands, an order to perform a random access procedure, or a semi-persistent scheduling activation or deactivation). A separate DCI packet may be transmitted by the base station to a UE for each traffic packet/sub-frame transmission.

BRIEF DESCRIPTION OF THE DRAWINGS

FIG. 1B illustrates an example Long Term Evolution (LTE) system;

FIG. 1E is a diagram illustrating assignment message construction and mapping to PDCCH;

FIG. 5 illustrates a schematic diagram illustrating a process for managing a receiver of a user equipment;

FIG. 6A-C are schematic diagrams illustrating sequences when no data is transmitted;

FIG. 7 is a codeword system illustrating a set of wake-up indicators being encoded and decoded;

FIGS. 8A-D are mappings between codewords and values of wake-up indicators;

DETAILED DESCRIPTION

Figure 1A:
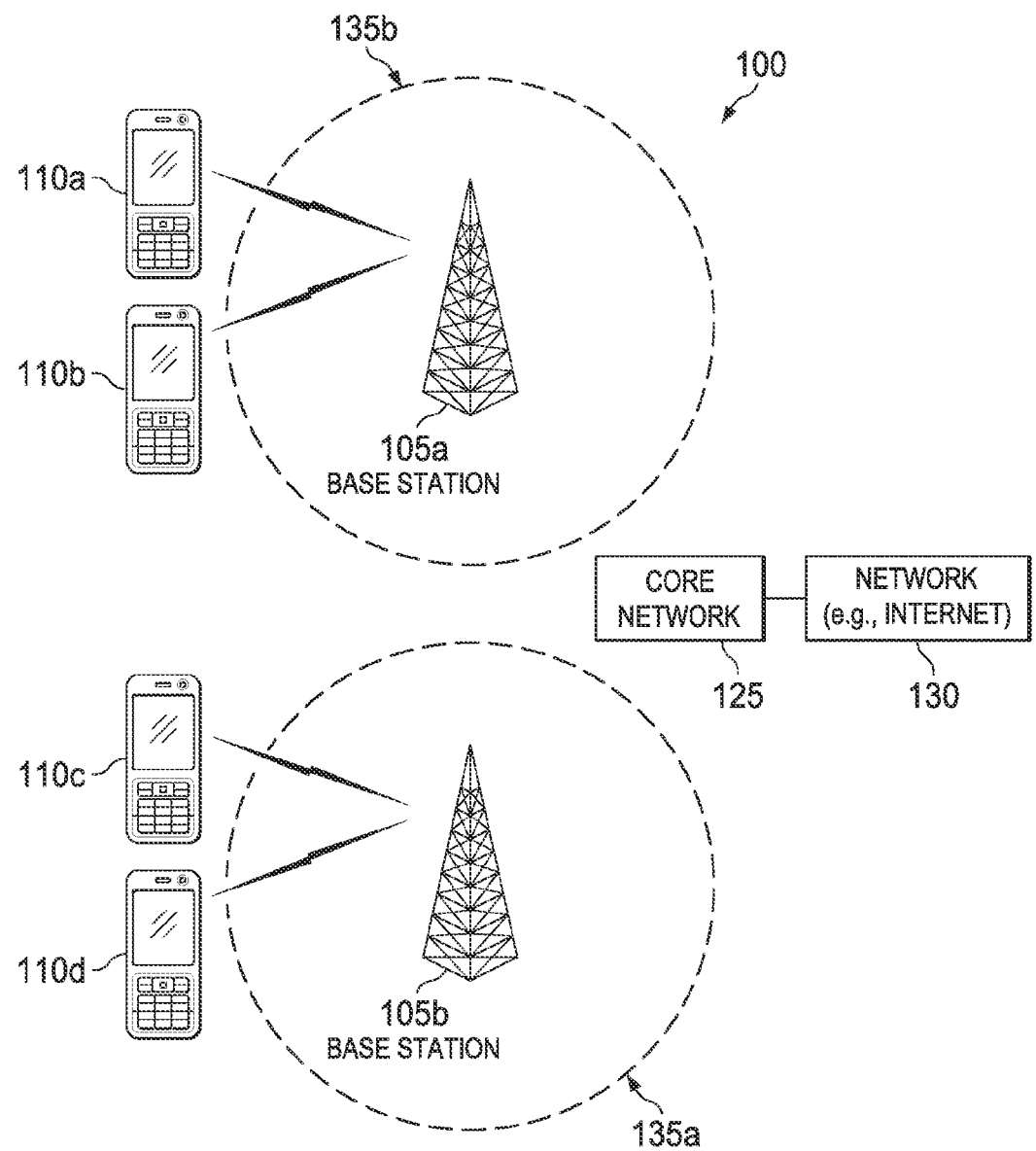
FIG. 1A illustrates an example a wireless system architecture.

FIG. 1A shows an example of a wireless communication system. A wireless communication system includes one or more radio access networks 135 and one or more core networks 125. Radio access networks 135a and 135b include one or more base stations (BSs) 105a, 105b. The system may provide wireless services to one or more wireless devices 110a, 110b, 110c, and 110d. Base stations 105a and 105b can provide wireless service to wireless devices 110a-d in one or more wireless sectors. In some implementations, base stations 105*a*, 105*b* use directional antennas to produce two or more directional beams to provide wireless coverage in different sectors. A core network 125 communicates with one or more base stations 105*a* and 105*b*. In some implementations, a core network 125 includes one or more base stations 105*a* and 105*b*. The core network 125 may include wireless communication equipment such as one or more servers. In some implementations, the core network 125 is in communication with a network 130 that provides connectivity with other wireless communication systems and wired communication systems. The wireless communication system may communicate with wireless devices 110*a-d* using a wireless technology such as one based on orthogonal frequency division multiplexing (OFDM), Orthogonal Frequency Division Multiple Access (OFDMA), Single Carrier Frequency Division Multiple Access (SC-FDMA), Discrete Fourier Transform Spread Orthogonal Frequency Division Multiplexing (DFT-SOFDM), Space-Division Multiplexing (SDM), Frequency-Division Multiplexing (FDM), Time-Division Multiplexing (TDM), Code Division Multiplexing (CDM), or others. The wireless communication system may transmit information using Medium Access Control (MAC) and Physical (PHY) layers. The techniques and systems described herein may be implemented in various wireless communication systems such as a system based on Long Term Evolution (LTE) Global System for Mobile Communication (GSM) protocols, Code Division Multiple Access (CDMA) protocols, Universal Mobile Telecommunications System (UMTS), Unlicensed Mobile Access (UMA), or others.

Wireless devices, such as smartphones, may generate and consume significant amounts of data over a wide variety of data traffic types and services. Smartphone devices may be viewed as computing platforms with wireless connectivity, capable of running a wide-ranging variety of applications and services that are either pre-installed by the device manufacturer or installed by the user according to the user's specific usage requirements. The applications may originate from a wide-ranging group of sources such as software houses, manufacturers, and third-party developers.

Wireless networks may distinguish between user-plane traffic and control-plane traffic. Various examples of user-plane traffic and services carried by wireless networks include voice, video, internet data, web browsing sessions, upload/download file transfer, instant messaging, e-mail, navigation services, RSS feeds, and streaming media. Control-plane traffic signaling may be used to enable or support transfer of the user plane data via the wireless network, including, for example, mobility control and radio resource control functionality. Various examples of control plane traffic include core-network mobility and attachment control, (e.g., Non-Access Stratum (NAS) signaling), radio access network control (e.g., Radio Resource Control (RRC)), and physical layer control signaling such as may be used to facilitate advanced transmission techniques and for radio link adaptation purposes.

Applications, communicating via a wireless network, may utilize Internet-based protocols to achieve a desired effect when provisioning for a specific service. For example, a navigation application may utilize TCP for file transfer of mapping data from a server to a device. The navigation application may use periodic keep-alive signaling (e.g., exchanging PING messages) towards the navigation server to maintain an application-level connection in the presence of intermediary network nodes such as stateful firewalls. Similarly, an e-mail application may use a synchronization protocol to align mailbox contents on a wireless device with those in the e-mail server. The e-mail application may use a periodic server polling mechanism to check for new e-mail.

Wireless network designs are influenced by the data demands produced by various applications and associated data traffic distributions. For example, the amount and timing of data traffic may vary (e.g., bursty communications). To adapt, wireless communication networks may include dynamic scheduling such that a quantity of assigned shared radio resources may be varied in rapid response to data demand (e.g., data buffer status). Such dynamic scheduling can operate on a time scale of one to two or three milliseconds. At a time scale above this (e.g., operating in the region of 100 milliseconds to several seconds), wireless networks can use a state-machine-oriented process or other system reconfiguration process to adapt a radio connection state or sub-state to the degree of observed traffic activity. Radio connection states or sub-states may differ both in the degree of connectivity offered and in terms of the amount of battery power consumed by a wireless device.

A connectivity level can be characterized as representing connectivity attributes, such as location granularity, assigned resources, preparedness, and interfaces or bearers established. A location granularity attribute may be the accuracy to which a wireless network can track the current location of a wireless device (e.g., to the cell level for more active devices, or to only a group of cells for less active devices). Examples of assigned resource attributes include the presence, absence, type or amount of radio transmission resources available to the wireless device for performing communication, as a function of expected activity level.

A preparedness attribute is an ability of a wireless device to receive or transmit information. The power consumed by wireless devices may reflect a function of an ability of a wireless device (or readiness) to transmit or receive. For example, a wireless device can activate its receiver in order to receive downlink communication from a base station at any given instant, which may cause higher power consumption and battery drain. To save power, a mode referred to as discontinuous reception (DRX) may be used. In DRX, the wireless device can place its receiver in a sleep mode, e.g., turning off its receiver at certain times. The base station uses knowledge of a UE's DRX pattern (e.g., sequence of wake-up intervals of the device) when determining times to transmit to a wireless device that is in a DRX mode. For example, a base station determines a time in which the wireless device will be actively listening for a transmission. The activity cycle of a DRX pattern can vary as a function of an assigned radio connection state or sub-state.

Interfaces (or bearers-established) attributes are other examples of connectivity attributes. End-to-end communications (e.g., from a wireless device to a core network gateway or egress node towards the Internet) can require that user-specific connections, or bearers, are established between participating network nodes or entities. User-plane connectivity through a radio access network and a core network can require the establishment of one or more network interfaces between various pairs of network nodes. The establishment of one or more of these network interfaces can be associated with a radio connection state or sub-state as a function of the current activity level.

FIG. 1B is an LTE system 140 for managing activation of a receiver of the UEs 145*a* and 145*b* in accordance with some implementations of the present disclosure. For example, the system 140 may be arranged to allow deactivation of a UE receiver during one or more portions of time known as discontinuous reception instances (DRX). During other portions of time (non-DRX), the UE receiver may be activated. The portions of time may comprise one or more time units known as sub-frames, a sub-frame having a duration of 1 millisecond. A periodic cycle known as a DRX cycle may be configured and which defines those sub-frames that are designated as non-DRX. During a non-DRX sub-frame within a DRX cycle, the UE may receive a PDCCH region of the sub-frame and must also be prepared to receive a Physical Downlink Shared CHannel (PDSCH). In some implementations, the system 140 includes a "wake-up" signal within the PDCCH region of the sub-frame for LTE connected mode UEs, and the wake-up signal may have carefully designed properties such that system efficiency and UE battery efficiency are improved. The system 140 may or may not add new Radio Resource Control (RRC) states to execute the UE receiver management. For example, the system 140 may retain the idle mode and connected mode RRC states only, or a new RRC state may be introduced. In the case that no new RRC states are introduced, a connected mode UE (for example one that may have been inactive for longer than a predetermined period of time), may be placed into a "connected mode deep sleep" (or CMDS) sub-state of connected mode. By adding the CMDS sub-state, the system 140 may provide additional system efficiency and UE battery savings. For example, the UE may not search for UE-specific uplink and downlink assignments during non-DRX sub-frames when in the CMDS sub-state (it does not need to be ready to receive immediate user plane data on those sub-frames). A UE in the CMDS sub-state may instead search only for a connected-mode wake-up signal during a non-DRX sub-frame. This allows for processing complexity reductions in the UE during any non-DRX'd sub-frame. In another example, the UE may be addressable via group wake-up Radio Network Temporary Identifier (RNTIs) when in the CMDS sub-state (as compared with dedicated UE-specific RNTIs), such that the system may efficiently wake-up multiple devices within the same PDCCH message and during the same sub-frame. In some implementations, the UE may only receive the PDCCH region for the wake-up signal (the network may not be allowed to send PDSCH to the UE during the same sub-frame as a wake-up). This may allow the UE to switch off its RF, analogue and front-end receiver circuitry (e.g., element 1215 of FIG. 12) immediately following the PDCCH region of any non-DRX sub-frame, irrespective of the PDCCH processing/decoding latency. This may allow for a substantially lower fraction of time for which the receiver must be on when operating under a DRX cycle. For example, it may allow for the receiver to be on for only 3 OFDM symbols of each actively-received sub-frame rather than for 14 symbols (a reduction of 78% in receiver "on" time for the same sub-frame DRX duty cycle). Conversely, it may allow for shorter DRX cycles (providing lower latency) but without a corresponding increase in UE power consumption.

In the illustrated implementation, the LTE system 140 can include a core network called an Evolved Packet Core (EPC) and an LTE Radio Access Network, e.g., evolved UTRAN (E-UTRAN). The core network provides connectivity to an external network such as the Internet 170. The system includes one or more base stations such as eNode-B (eNB) base stations 150a and 150b that provide wireless service(s) to one or more devices such as UEs 145a and 145b.

An EPC-based core network can include a Serving Gateway (SGW) 160, a Mobility Management Endpoint (MME) 155, and a Packet Gateway (PGW) 165. The SGW 160 can route traffic within a core network. The MME 155 is responsible for core-network mobility control, attachment of the UE 145 to the core network and for maintaining contact with idle mode UEs. The PGW 165 is responsible for enabling the ingress/egress of traffic from/to the Internet 170. The PGW 165 can allocate IP addresses to the UEs 145.

An LTE-based wireless communication system has network interfaces defined between system elements. The network interfaces include the Uu interface defined between a UE and an eNB, the S1U user-plane interface defined between an eNB and an SGW, the SIC control-plane interface defined between an eNB and an MME (also known as S1-MME), and the S5/S8 interface defined between an SGW and a PGW. Note that the combination of S1U and SIC is often simplified to "S1."

A wireless device can transition between connection states, such as RRC connection modes. In the LTE system, two RRC connection modes exist, RRC connected and RRC idle. In an RRC connected mode, radio and radio access bearers (e.g., the Uu and S1 bearers) are established to enable the transfer of user plane data through a radio access network and onwards to the core network. In the RRC idle mode, radio and radio access bearers are not established and user-plane data is not transferred. In some implementations, a limited degree of control signaling is possible in idle mode to enable the wireless network to track the location of the device should a need for communications arise.

A wireless device, in an RRC-connected state, can use a DRX operational mode to conserve power by turning-off transceiver functionality, e.g., turning-off transceiver circuitry such as receiver circuitry. In some implementations, a wireless device ceases to monitor a wireless channel and, accordingly, ceases to operate a digital signal processor to decode wireless signals while in the DRX operational mode.

Figure 1C:
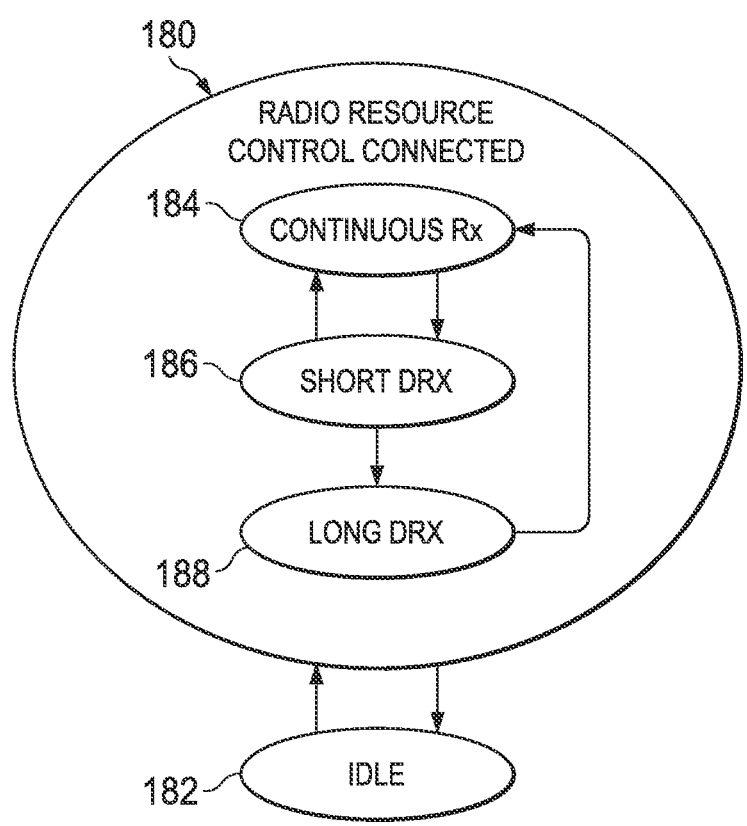
FIG. 1C illustrates RRC connection states and DRX sub-states in LTE.

FIG. 1C shows an example of a transition diagram for RRC and DRX. RRC connection states include an RRC connected state 180 and an idle state 182. Transitions between the idle state 182 and the connected state 180 are effected via RRC establishment and release procedures. Such transitions can produce associated signaling traffic between a wireless device and a base station.

UE DRX functionality may comprise a mechanism to control when the UE monitors a wireless grant channel such as the downlink Physical Common Control Channel (PDCCH) in LTE by application of discontinuous reception. The specific times during which the UE may be active and capable of reception may be described by a time-domain pattern known as a DRX cycle. The time domain pattern may vary or may be reconfigured as a function of a data activity level. Such a variation or reconfiguration may further be triggered or controlled by timers. For a particular communication between a network and a UE, a plurality of possible DRX cycle configurations may exist and one of the plurality may be selected in accordance with a desired system operation for the communication. In such a case, the system may include a plurality of DRX sub-states and a controller configured to select an appropriate DRX sub-state from the plurality of DRX sub-states based, at least in part, on a desired system operation. Parameters or timers controlling or defining the DRX cycle may be associated with each of the plurality of DRX sub-states according to system configuration. In some implementations, DRX sub-states per-se may not be explicitly implemented and in such a case the term "DRX sub-state" may refer only to a particular configuration of parameters or condition of one or more timers (e.g., running or not running). The term "DRX sub-state" may therefore be used interchangeably with "DRX status" of DRX-related parameters or timers; hence, a configured plurality of DRX-related parameters may be referred to as a DRX sub-state.

The RRC connected mode state 180 may be associated with a plurality of DRX sub-states (or DRX status) within the Medium Access Control (MAC) layer. The DRX sub-states (or DRX status) include a continuous reception (continuous-rx) state 184, a short DRX state 186, and a long DRX state 188. In the continuous reception state 184, a device may be continuously monitoring all or almost all downlink sub-frames for wireless traffic and can transmit data. In the short DRX state 186, the device can be controlled to turn off its receiver (e.g., sleep, or DRX) for all but Q out of N sub-frames. In the long DRX state 188, the device can be controlled to turn off its receiver (e.g., sleep, or DRX) for all but Q out of M sub-frames, where M is typically greater than N. In one example, Q equals 1, N equals 8 and M equals 256. In an LTE-based system, a sub-frame is a 1 millisecond unit of transmission time.

In some implementations, an expiration of an inactivity timer causes a state transition (e.g., continuous reception state 184 to short DRX state 186 or short DRX state 186 to long DRX state 188). Resumption of activity, such as the device having data to transmit or receiving new data, can cause a transition from a DRX state 186, 188 to the continuous reception state 184. In some implementations, a base station sends a MAC command that causes a transition from the continuous reception state 184 to one of the DRX states 186, 188. In other words, MAC commands may also be used by the network (sent from eNB to the UE) in order to explicitly direct a transition to a different DRX sub-state with a longer DRX cycle. A resumption of data activity typically results in a transition to the continuous reception sub-state. Transitions between Idle and Connected Mode may be effected using explicit RRC establishment and release signaling procedures, which involves associated signaling overheads. The base station's decision to send a MAC command to cause the UE to transition to another DRX sub-state may be based on timers within the network, or may be based on a plurality of other factors or events. In one improved method, the base station may send the MAC command in response to a fast dormancy request received from the UE, the fast dormancy request indicating the UE's desire to be transitioned to a more battery-efficient state, the more battery-efficient state comprising a new DRX sub-state or new DRX status. The UE may transmit a fast dormancy request (e.g., explicit message, indication message) to the network based on a determination that no more data transfer is likely for a prolonged period. For example, the UE may transmit the explicit message (e.g., an indication message) requesting an updated sub-state to a more battery efficient sub-state and the request to release resources. In some implementations, the explicit message (or indication message) may be a Signaling Connection Release Indication (SCRI) message. The UE's step of determining may involve an appraisal of currently-operational applications or processes running on the mobile device, and/or the status of acknowledged mode protocols or acknowledged mode transfer of data. For example, if the UE is aware that a particular data transfer has ended due to its reception of an acknowledgement message, the UE may decide to send a fast dormancy request to the network. The network may respond with a message to the UE to indicate that it should move to a new DRX sub-state or to otherwise alter its DRX status. This message may be sent within a MAC CE command or may be sent within a physical layer message such as on a PDCCH. In the improved method, receipt of the message at the UE not only triggers a transition to a new DRX sub-state or a change in DRX status, but also triggers a release of assigned uplink control resources. Thus, by use of this improved method, the network does not need to send a further message specifically for the purposes of releasing the uplink resources, and signaling overheads are thereby reduced.

In each of these DRX sub-states, both the UE and network can, in some implementations, be synchronized in terms of the currently-applicable DRX status or DRX sub-state such that both the network and UE identify when the UE receiver is active and when the UE receiver may be "off", "asleep" or otherwise inactive. Within the connected mode, the synchronization may be achieved using network-configured timers and/or parameters.

The LTE system may also provide for DRX battery saving in RRC Idle. When in Idle Mode, the UE may employ a DRX pattern according to a so-called paging cycle. On a possible paging occasion, the UE may activate its receiver to check for a page message sent by the network. At other times, the UE may deactivate its receiver in order to conserve power.

Based on the illustrated transition diagram, within the LTE system, two different approaches may be employed to control the UE's RRC state as a function of data activity or inactivity. In the first approach, inactive devices may be transitioned to idle mode relatively quickly. A resumption of data activity may invoke execution of RRC connection establishment procedures and may incur signaling overhead. In the second approach, inactive devices may be held for a considerable time (for example, many minutes, even hours) in RRC Connected Mode before a transition to idle is executed.

A UE may have a lower power consumption in RRC idle mode than in RRC Connected Mode; therefore, from a UE power consumption perspective, the first approach may provide power saving advantages when compared to the second approach. However, to transfer those UEs that have been inactive for a period of time to the RRC idle state may require use of an explicit RRC connection release message sent by the eNB to the UE. An RRC connection setup procedure may also be used upon each resumption of data activity. Hence, whilst the first approach can be battery efficient, the first approach may include potentially large signaling overheads and therefore lower system efficiency.

The signaling overheads associated with the first approach may be substantially avoided using the second approach. Though, the second approach may include increased battery consumption by the mobile device (this being a function of how battery efficient the DRX procedures are when in connected mode). Furthermore, power consumption within an RRC connected mode DRX sub-state may also be higher than that of Idle Mode due to the use of network controlled mobility when in RRC Connected Mode. In Connected Mode, the UE typically sends signal strength/quality measurement reports to the eNB either periodically, or on a triggered basis (for example, on detection of deteriorating signal conditions). The eNB may then be in control of when to direct the UE to hand over to another cell. Conversely, in RRC Idle Mode, mobility may be UE-controlled. That is, the UE may not report the signal strength/quality of other cells to the network but may use its own measurements of such to select the preferred cell. Cells within the network may be arranged into logical groups known as tracking areas, each of which may consist of a plurality of cells. When in RRC Idle Mode, the UE may notify the network when changing to a cell within a new tracking area. This process (known as a tracking area update) typically occurs relatively infrequently and, in addition to the infrequent paging/DRX cycles, may reduce UE battery consumption whilst in the RRC Idle Mode.

The first approach may be referred to as a "call-oriented" model. A burst of data activity may be treated similar to a phone call or other communication session, wherein at a macro level the packet data "call" is either "on" or "off". Within a packet data call and on a micro time scale, data activity may not be continuous, but the packet call may be treated as "active" or "in-call" by the network for a relatively short period of time. The UE may be held in the RRC connected mode for the duration of the packet call. For sustained inactivity beyond this relatively short period of time, the UE may transition to Idle. With this understanding, a packet call can, in some implementations, comprise a burst of packet activity spanning only a few hundred milliseconds or up to a few seconds, for example, when downloading a particular web page from the interne. Subsequent packet calls with associated transitions to/from Idle may exist for other web pages accessed perhaps 20 seconds later.

Figure 1D:
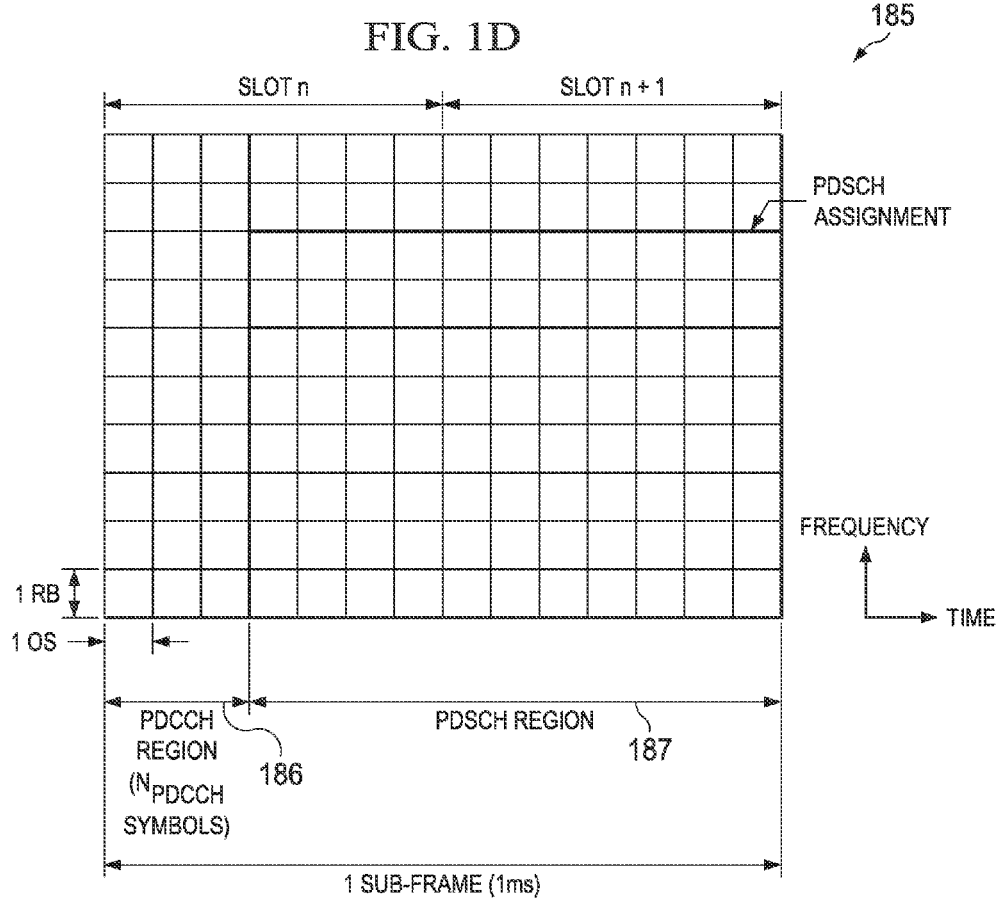
FIG. 1D illustrates an example downlink sub-frame.

FIG. 1D is a downlink sub-frame 185 illustrating the time/frequency structure. The sub-frame 185 is sub-divided into two equal length slots (numbered here n and n+1). In the time domain, the PDCCH region 186 comprises the first 3 out of the 14 total OFDM symbols (OS) within the sub-frame. An assignment to a UE may be contained somewhere within the PDCCH region 186. An example PDSCH 187 allocation is also shown, here spanning 2 resource blocks (each resource block in LTE comprises a frequency region equal to 12 sub-carriers at 15 kHz spacing, so 180 kHz).

In general, the LTE system is constructed with heavy reliance on the principle of shared channels. Access to the uplink and downlink shared channels within a cell, (UL-SCH and DL-SCH respectively) may be governed by a centralised scheduling function residing within the basestation or eNB. UEs may be notified of uplink or downlink assignments (or "grants") via control signalling messages carried from the eNB to the UE on a Physical Downlink Common Control Channel or PDCCH.

Whenever an LTE connected mode UE actively receives a sub-frame (i.e. any non-DRX'd sub-frame), it may search the PDCCH resource region of the sub-frame for any UL or DL assignments directed towards it. The PDCCH resource region may occupy the first NPDCCH OFDM symbols of a sub-frame where NPDCCH is a variable number (typically from 1 to 4 symbols depending on system configuration). If the decoded PDCCH reveals a valid assignment for the UE, the UE proceeds to either: for an UL assignment, configure its transmitter in preparation for a forthcoming UL transmission on the assigned UL resources; or for a DL assignment, decode the corresponding resource portion in the remaining parts of the same DL sub-frame in which the PDCCH was received.

Note that PDCCH messages may not contain UL or DL assignments and which are instead used to carry other control-related information such as an instruction for the UE to carry out a random access procedure. Such non-assignment messages are termed "PDCCH orders".

FIG. 1E is a diagram 188 illustrating construction of an assignment message 189 to a UE. An assignment message 189 of length L1 bits is passed to a CRC encoder 190 and the resulting CRC 191 is scrambled (bit-wise XOR'd 192) with a UE ID field the same length as the CRC 191 (the UE ID may comprise e.g. a Radio Network Temporary Identifier or "RNTI").

The scrambled CRC 193 is appended to the original message 189 and the concatenated result is encoded (e.g. by a convolutional or other forward error correction encoder 194) to form a total encoded message 195 of length L2 bits. The length L2 may take one of 4 values, each corresponding to a so-called Control Channel Element (CCE) 'aggregation level' of 1, 2, 4 or 8. By varying the length of the message (L1) prior to encoding and/or the aggregation level (determining L2), the strength of the forward error correction may be adjusted.

The use of a scrambled CRC 193 provides an efficient means to convey the intended destination user ID to the UE receiver without actually transmitting explicit bits for this purpose. Each UE receiver checks the integrity of the received and decoded CRC only after also performing an equivalent XOR (descrambling) operation with its own user ID. Thus, only assignment messages communicated error free over the radio link AND decoded by the user with the intended user ID will pass the CRC integrity check and will be classified as valid assignments. The pre-encoded assignment message (of length L1 bits) is often referred to as a Downlink Control Information Format (or DCI Format) in the 3GPP specifications.

The strength of the forward error correction encoding applied to an assignment message may depend upon the pre- and post-encoding message sizes (L1 and L2). These however are not explicitly indicated by the eNB to the UE and instead the UE may attempt to determine the applied transmit encoding via successive trial-and-error decoding attempts using its knowledge of the different allowable L1 and L2 lengths. Furthermore, in order that multiple assignment messages directed to different UEs may be flexibly arranged and 'packed' into the available PDCCH resource region, the UE may search a plurality of possible locations (in addition to the different message lengths) within the PDCCH region for the presence of any possible assignment for it. This is known as blind decoding within a defined search space.

The processing loads arising in the UE from blind decoding of PDCCH can be considerable. The number of possible combinations of message position and pre/post-encoder message lengths are therefore constrained to a limited number of predefined possibilities; that is, both the number of FEC encoding possibilities and the search space are reduced. Candidate combinations of message position and L2 message length are defined. For each candidate combination a UE must then check for each of the possible L1 message lengths by performing a blind decoding operation. In the current LTE system, a UE must typically perform up to 44 blind decodes for each PDCCH reception instance. This may comprise a search for 2 possible L1 message lengths for each of 6 candidate combinations within a so-called "common search space" and a search for 2 further L1 message lengths for each of 16 candidate combinations within a so-called "dedicated search space" or (interchangeably) "UE-specific search space". (6*2)+(16*2)=44 blind decodes. The same common search space is read by all UEs in the system whereas the locations of the dedicated search spaces may differ for each UE. The dedicated search space for a UE varies on each sub-frame according to a predefined sequence known to both the UE and the eNB. The predefined sequence is a function of an RNTI associated with the UE.

Each blind decode involves running a tail-biting convolutional code decoding operation which can contribute to a significant amount of processing and battery drain for a device remaining in connected mode for an extended period, even if in long DRX.

Figure 2A:
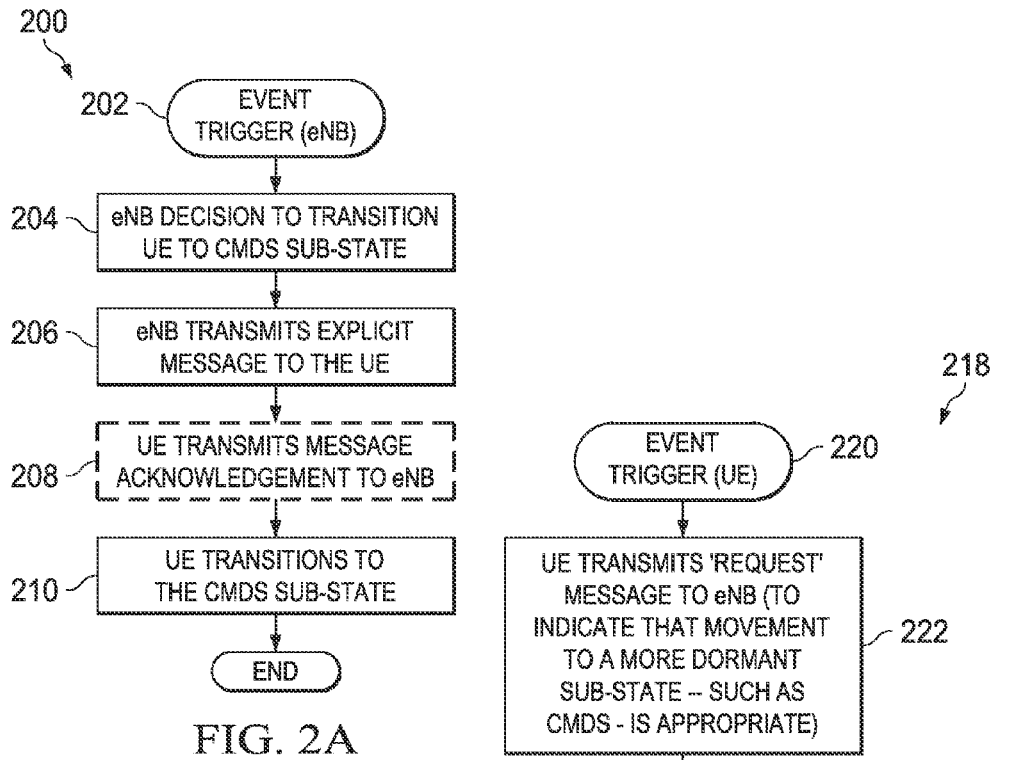
FIGS. 2A and 2B are flow charts for illustrating methods for explicitly transitioning the states of the UEs.
Figure 2B:
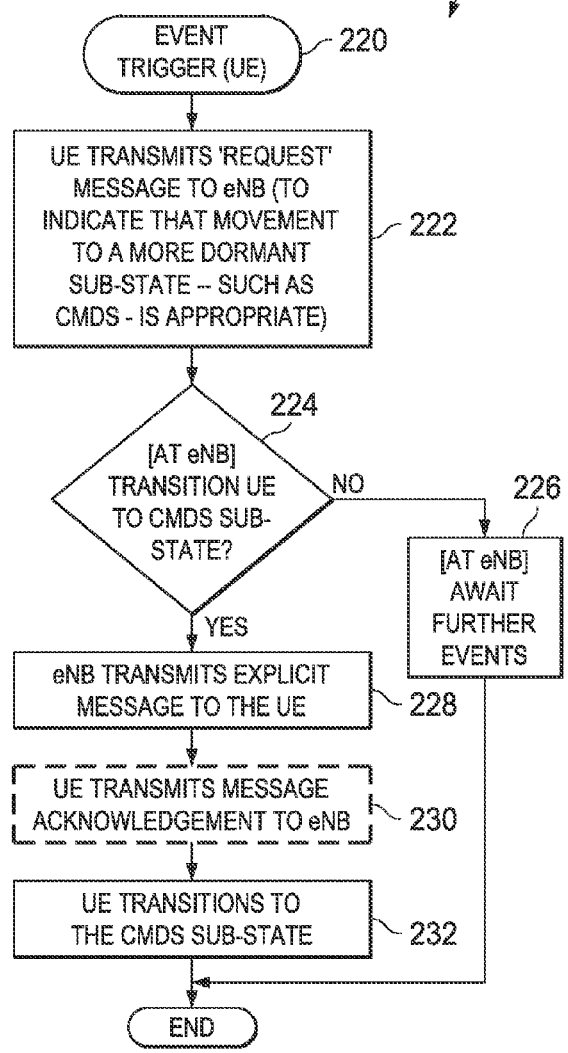

FIGS. 2A and 2B are flowcharts illustrating example methods 200 and 218, respectively, for explicit transitions to a deeper-sleep (e.g. CMDS) sub-state of connected mode. The illustrated method is described with respect to system 140 of FIG. 1, but this method could be used by any other suitable system. Moreover, system 140 may use any other suitable techniques for performing these tasks. Thus, many of the steps in this flowchart may take place simultaneously and/or in different orders as shown. System 140 may also use methods with additional steps, fewer steps, and/or different steps, so long as the methods remain appropriate.

Generally, in an explicit transition method, the UE 145 may enter the CMDS sub-state in response to at least an explicit message or command transmitted by eNB 150. In an eNB-initiated explicit transition method 200, the eNB 150 may send or transmit the explicit network message in response to an event. In other words, the eNB 150 may detect or otherwise identify an event that triggers the transmission of the explicit message. A trigger event 220 may be the expiry of a data packet inactivity timer (the timer maintained by the eNB 150), and/or another event.

Alternatively or in combination, in the UE-initiated explicit transition method 218, the UE 150 may first send or transmit a 'request' message to the eNB 150 requesting a transition to the CMDS sub-state based, at least in part, on knowledge or information determined or otherwise identified by the UE 145. In some implementations, this information may be knowledge or information relating to: the status of applications on the device (e.g., open, running, closed, dormant), data protocols associated with applications on the device (e.g., 'data transfer complete', 'protocol procedure complete', 'data segment acknowledged'), and/or other knowledge or information identified by the UE 145. The 'request' message may indicate, for example, a high likelihood that no more packet data is expected for a period of time. Other knowledge or information may also be used by the UE 145 when formulating the 'request' message such as the status of other functions or input to the UE (e.g. screen on/off, presence or absence of user keyboard or touch-screen input, presence or absence of voice-activated input). In either case, the explicit message may be transmitted through one of several protocol layers in the communications system, for example, via RRC signaling, MAC signaling or L1 signaling.

In either of the two cases shown in FIGS. 2A and 2B, the system 140 may or may not be configured such that UE 145 returns an acknowledgement (208/230) confirming receipt of the explicit message from the eNB 150. The acknowledgement may be sent at various protocol layers, for example, Radio Resource Control (RRC), RLC, HARQ (L1), and/or others. An acknowledgement may ensure that both the UE 145 and the eNB 150 have the same understanding of the UE's current state (CMDS or not). The eNB 150, the UE 145, or both may execute other actions or procedures upon the UE 145 entering the CMDS sub-state. For example, requirements for the UE 145 to return one or more measurement reporting types that are not considered essential for correct operation when in the CMDS sub-state may be terminated, measurement reporting may be limited to those needed for mobility-control only, or both. For example, UE reporting related to Self-Optimising Networks (SON), Automatic Neighbour Relations (ANR) and Minimisation of Drive Test (MDT) purposes may be identified as nonessential measurements, so these measurement configurations may be released autonomously in the UE 145 and the eNB 150 on transition to the CMDS sub-state. Alternatively or in combination, their configurations may be deactivated by the UE 145 and the eNB 150 upon entering the CMDS sub-state and resumed upon exiting the CMDS sub-state. Requirements for the UE to transmit one or more uplink control signal types (such as for Channel Quality Indication—CQI, Precoding Matrix Indication—PMI, Rank Indication—RI, and uplink Sounding Reference Signals—SRS) may also be terminated upon entering the CMDS sub-state. Such procedures may allow for improved UE battery savings when in the CMDS sub-state due to reduced UE processing requirements to formulate the measurement reports or to process UL control signals/feedback and due to the reduced occurrence of uplink transmission by the UE. Following transmission of the explicit message in either method 200 or 218, the UE and eNB may be synchronized in their understanding of when the transition to the CMDS sub-state occurred (e.g., a predetermined period of time following the message transmission or the acknowledgement transmission).

Referring to FIG. 2A, method 200 begins at step 202 where eNB 150 identifies an event trigger associated with transitioning to the CMDS sub-state. At step 204, the eNB 150 determines to transition the UE 145 to the CMDS sub-state based, at least in part, on the identified the event trigger. Next, at step 206, the eNB 150 transmits an explicit message to the UE 145 to transition to the CMDS sub-state of the DRX cycle. In response to the explicit message, the UE 208 may transmit an acknowledgement message to the eNB 150. In some implementations, the acknowledgement message may be optional. At step 210, the UE 145 transitions to the CMDS sub-state.

Referring to FIG. 2B, the method 218 begins at step 220 where UE 145 identifies an event trigger associated with transitioning to the CMDS sub-state. At step 222, the UE 145 transmits a request message to the eNB 150. If the eNB 150 determines not to transition the UE 145 at decisional step 224, then, at step 226, the eNB 150 waits for further events. If the eNB 150 determines to transition the UE 145, then, at step 228, the eNB 150 transmits an explicit message to the UE 145 to transitions to the CMDS sub-state. Next, at step 230, the UE 145 transmit message acknowledgement to the eNB 145. In some implementations, the acknowledgement message may be optional. At step 232, the UE 145 transitions to the CMDS sub-state.

Figure 3A:
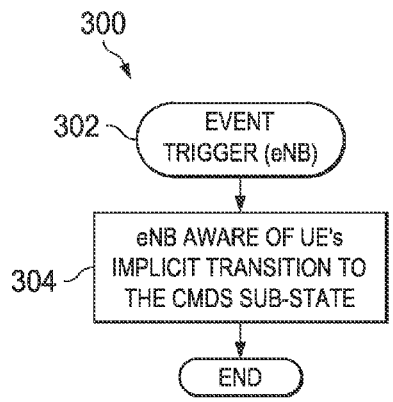
FIGS. 3A and 3B are flow charts for illustrating methods for implicitly transitioning the states of the UEs.
Figure 3B:
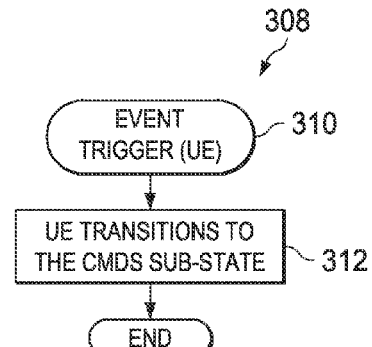

FIGS. 3A and 3B are flowcharts illustrating example methods 300 and 308 for implicit transitions to the CMDS sub-state. In an implicit transition method, the UE 145 may transition to the CMDS sub-state as the result of an event commonly-known to both the UE 145 and the eNB 150. Because the timing of the event is known to both the UE 145 and the eNB 150, the UE 145 may enter the CMDS sub-state without the use of an explicit signaling message, thereby saving some signaling overhead. The known event may include one or more of the following: the expiry of an inactivity timer (such as a time since the last active uplink or downlink data or packet transmission instance); the expiry of an uplink timing alignment timer; a DRX cycle counter reaching a predetermined threshold value; a timer expiring or a counter reaching a predetermined value subsequent to the timer or counter having been reset or initialized based on another DRX sub-state transition (e.g. continuous-Rx to long or short DRX); or others.

Referring to FIG. 3A, method 300 begins at step 302 where the eNB 302 identifies an event trigger associated with transitioning to the CMDS sub-state. At step 302, the eNB 150 determines that the UE 145 implicitly transitioned to the CMDS sub-state. Referring to FIG. 3B, method 308 begins at step 310 where the UE 145 identifies the event trigger associated with transitioning the CMDS sub-state. At step 312, the UE 145 transitions to the CMDS sub-state of the DRX cycle.

In either the explicit transitions discussed in connection with FIGS. 2A and 2B or the implicit transitions discussed in connection with FIGS. 3A and 3B, the eNB 145 or UE 150 may be implemented to detect the erroneous event such that the UE 145 and eNB 150 do not have the same understanding regarding the UEs current status (CMDS or not). For example, if the eNB 150 persistently receives no response from the UE 145 following PDSCH transmissions, the eNB 150 may infer that the UE 145 has moved to the CMDS sub-state and may attempt to contact the UE using CMDS procedures such as use of a wake-up signal directed to that UE 145. Alternatively or in combination, the UE 145 may need to occasionally check for wake-up signals even when the UE 145 identifies a status other than the CMDS sub-state, in order to detect the situation wherein the eNB 150 incorrectly believes the UE 145 to be in the CMDS sub-state.

The UE may exit the CMDS sub-state upon certain events. These exit events may include one or more of the following: receipt of a positive wake-up indicator from the eNB; initiation of resumed UL transmission procedures by the UE (e.g., sending of a random access message, a scheduling request message, or other uplink message by the UE); or others. In response to at least an exit event, the UE 145 may return to normal (non-CMDS) connected mode operation. If the UE 145 receives a positive wake-up indicator when in the CMDS sub-state, the UE 145 may exit the CMDS DRX cycle and return to the continuous reception sub-state of the connected mode.

If the UE 145 determines a need to resume UL transmission when in the CMDS sub-state, the UE 145 may send a preamble on a physical random access channel (PRACH), or the UE may send a scheduling request on a physical uplink control channel (PUCCH). The choice regarding whether to use the PRACH or the PUCCH to resume UL transmission may depend on whether the UE is uplink-synchronized to the eNB 150 (determined according to the status of a timing alignment timer) or on whether PUCCH resources for SR have been assigned (by the eNB) to the UE.

On completion of the PRACH procedure or on receipt of an SR on PUCCH resources assigned to the UE 145, the eNB 150 may be able to determine the identity of the transmitting UE 145, and hence may be able to determine that the UE 145 has exited the CMDS sub-state. At this point, the eNB 150 and UE 145 may again be synchronized in terms of their understanding of the UE's status (CMDS or not). Optionally, a signal or message transmitted by the eNB 150 to the UE 145 may serve as an acknowledgement of its understanding that the UE 145 may no longer be in the CMDS sub-state. If the UE 145 does not receive such an acknowledgement from the eNB 150 within a certain time period following its attempts to resume UL transmission from within the CMDS sub-state, the UE 145 may return to the CMDS sub-state and may subsequently re-attempt resumption of UL transmission and a successful exit from CMDS.

When in the CMDS sub-state, the UE 145 may evaluate defined portions of time that are commonly known to both the UE and the eNB for a wake-up message. The eNB 150 may be aware that the UE 145 may not be contactable during other times. However, for correct system operation, a UE 145 in the CMDS sub-state may be required to search for certain other signals or messages. For example, in the current LTE system, connected mode users may search for paging messages addressed to a Paging Radio Network Temporary Identifier (P-RNTI) and which may be sent by the eNB 150 during certain pre-defined sub-frames in time. These paging messages may indicate to all or substantially all connected mode users in the cell that there has been a change in the cell's broadcast system information. Upon receiving such a paging message on P-RNTI, a connected mode user may read the updated broadcast system information. The broadcast system information may be sent on the PDSCH using DL assignments sent in the PDCCH region addressed to a System Information Radio Network Temporary Identifier (SI-RNTI).

This ability to inform connected mode users of updates to the broadcast system information may also be provided to CMDS users. A first solution may include the CMDS UEs checking not only for wake-up messages on PDCCH, but also (at the appropriate times) for messages addressed to P-RNTI on PDCCH. The messages addressed to P-RNTI on PDCCH may be associated with PDSCH transmissions, these containing the system information update indication. A second solution differs from the first solution in that it does not include the UE to verify for P-RNTI messages in the PDCCH. Instead, the UE may search for wake-up messages on PDCCH and the eNB 150 sends or transmits one or more wake-up signals to wake up all or substantially all CMDS users whenever there is a change to system information. This wake-up signal may optionally contain information enabling the UEs to determine the cause of the wake-up (system information update or otherwise). If the cause of the wake-up is communicated the CMDS, UEs 145 may subsequently exit the CMDS sub-state and read or determine the updated system information. If the cause is not communicated, the UEs 145 may still exit the CMDS sub-state and as a result, return to checking the defined sub-frames for messages addressed to P-RNTI. The eNB 150 may then send the paging message which is addressed to P-RNTI and includes a notification of a system information update. Subsequent to receiving this, the UEs 145 may read or determine the updated system information messages (which are themselves addressed to SI-RNTI).

Figure 4:
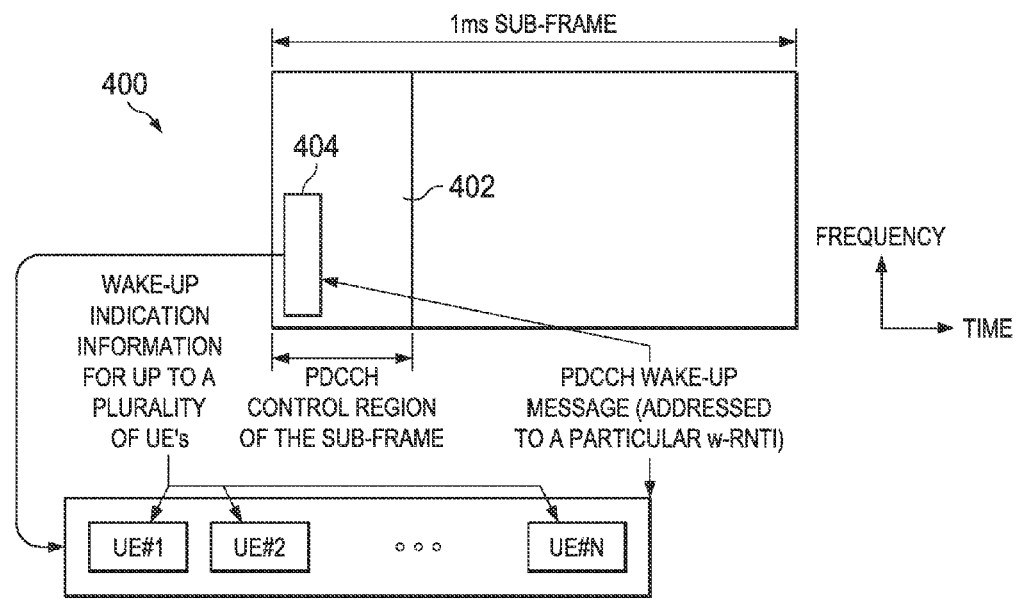
FIG. 4 illustrates an example sub-frame.

FIG. 4 illustrates a sub-frame 400 for transmitting multi-user wake up messages. In the illustrated implementation, the sub-frame 400 includes a PDCCH resource region 402; and the PDCCH resource region 402 includes the wake-up message 404. When in the CMDS sub-state, the UE 145 may search for the wake-up messages 404 during the PDCCH regions 402 of a pre-defined set of sub-frames. The PDCCH wake-up messages 404 may be addressed to a group of UEs 145 using a group identifier referred to as a wake-up Radio Network Temporary Identifier (w-RNTI). A PDCCH wake-up message 402 addressed to a particular w-RNTI may convey wake up indication information for one or more UEs 145 of the group.

A UE 145 may be configured with one or more of the following parameters or information fields that help define the set of possible PDCCH wake-up message instances applicable to the UE 145 when in the CMDS sub-state, and to define the formatting of the PDCCH wake-up messages such that they may be efficiently and correctly detected and decoded by the UE: parameters defining the DRX pattern behavior; a wake-up RNTI; information regarding the location of the bits associated with the UEs specific wake-up indicator within the wake-up messages; information restricting the pre- and post-encoding sizes of the wake-up messages; or others. The parameters defining the DRX pattern behavior may include DRX cycle duration, DRX sub-frame offset, DRX Inactivity Timer, or others. These may be the same DRX parameter values as used by the UE 145 when not in the CMDS sub-state, or may be alternate values that are used by the UE 145 when in the CMDS sub-state. The alternate (CMDS-specific) values may be individually signaled by the eNB 150 to each UE 145 via dedicated signaling or CMDS-specific values to be used by all CMDS UEs 145 may be sent by the eNB 150 via common (broadcast) signaling. The wake-up RNTI may be explicitly assigned by the eNB 150 to the UE 145 using dedicated signaling means. Alternatively or in combination, the wake-up RNTI may be derived by the UE 145 based upon a pre-existing ID for the same UE 145. The pre-existing UE ID may comprise a previously-assigned RNTI (e.g., C-RNTI), a subscriber ID (such as a Temporary Mobile Subscriber Identity—TMSI, or an International Mobile Subscriber Identity—IMSI), or a device ID (such as an International Mobile Equipment Identity—IMEI). The process of deriving may be based on a mathematical formula or a pre-defined associative table mapping the pre-existing UE ID to the UEs CMDS wake-up RNTI. Optionally, the formula, parameters related to the formula, or the associative table itself may be broadcast to all UEs within the cell by the eNB 150. The wake-up RNTI may be assigned for a certain duration, for example, the duration of a stay within the CMDS sub-state, or for the duration of a stay in connected mode. Information regarding the location of the bits associated with the UEs specific wake-up indicator within the wake-up messages (or other information allowing the UE to decode the common wake-up message and extract wake-up information specific to that UE). This information may be explicitly assigned by the eNB 150 to the UE 145 using dedicated signaling means. Alternatively this information may be derived by the UE 145 based upon a pre-existing ID for the same UE 145. The pre-existing UE ID may comprise a previously-assigned RNTI (e.g. C-RNTI), a subscriber ID (such as a Temporary Mobile Subscriber Identity—TMSI, or an International Mobile Subscriber Identity—IMSI), or a device ID (such as an International Mobile Equipment Identity—IMEI). The process of deriving may be based on a mathematical formula or a pre-defined associative table mapping the pre-existing UE ID to one or more parameters that collectively provide the UE 145 with the information used to decode the common wake-up message and extract wake-up information specific to that UE. Optionally, the formula, parameters related to the formula, or the associative table itself may be broadcast to all UEs within the cell by the eNB. The information may be assigned for a certain duration, for example, the duration of a stay within the CMDS sub-state, or for the duration of a stay in connected mode. Information restricting the pre- and post-encoding sizes of the wake-up messages (denoted here L1, and L2 respectively) and/or information as to where in the PDCCH time/frequency region, the eNB 150 may be allowed to transmit a wake-up signal specific to the shared wake-up RNTI.

The UE 145 may be associated with the above parameters and information explicitly, implicitly, or a mixture of the two. In the explicit method, the eNB 150 may assign the parameters or information via explicit signaling (e.g., RRC signaling, MAC signaling, L1 signaling). In the implicit method, the UE 145 and eNB 150 may calculate the parameters or information based upon a UE ID and a pre-defined formula or associative table which maps the UE ID to the parameter values or information fields. The formula or table may be pre-defined or may be described in full or in part via explicit signaling (e.g., broadcast by the eNB 150 in the system information of the cell, sent by the eNB 150 via dedicated signaling to the UE 145). In a partially-explicit, partially-implicit method, the eNB 150 may explicitly assigns one or more of the parameters or information fields to the UE 145 via explicit signaling, whilst those parameters that are not explicitly signaled are calculated by the UE 145 and eNB 150 based upon a UE ID and a pre-defined formula which maps the UE ID to the remaining parameter values, i.e., a combination of the above two methods.

Part or all of such CMDS configuration information may be pre-configured, or some/all parameters or information fields may be configured at the time of entry into the CMDS sub-state (e.g, carried within the explicit transition message sent by the eNB to the UE), or during a previous RRC connection establishment, or RRC (re)configuration procedure.

FIG. 5 is a schematic diagram 500 illustrating details of a downlink transmission of data to a UE residing initially in the CMDS sub-state. In the illustrated implementation, the diagram 500 includes a plurality of sub-frames 502 and a graph 504 illustrating UE receiver activation and deactivation. The UE 145 may again operate with a DRX cycle and sub-frame offset (as aforementioned, these may the same or different to those used when not in the CMDS sub-state). Again, according to the configured cycle, the UE 145 may be expected to actively receive sub-frame K (other sub-frames are notionally designated as DRX). Note however, that the UE 145 may only be expected to receive the PDCCH region 506 of sub-frame K (the eNB may not transmit PDSCH data to the UE 145 during sub-frame K). In this case, the UE 145 may disable front-end receiver circuitry of the UE receiver for all non-PDCCH regions of the sub-frame 506, which may allow for processing and battery power savings in the UE 145 during actively received sub-frames when in the CMDS sub-state compared to normal connected mode operation. Therefore, during sub-frame K, the UE 145 may receive and buffer only the signal for the PDCCH region 506 or at least a portion of the PDCCH region 506. After receiving the PDCCH region 506, the UE 145 may process the received PDCCH signal to identify any included messages addressed to a wake-up RNTI with which the UE 145 is associated and which the UE 145 may share with a number of other UEs in the CMDS sub-state.

On sub-frame K, the UE 145 may search for a PDCCH wake-up message 508 addressed to a wake-up RNTI associated with the UE 145. This process may be executed using a blind decoding operation using a convolutional decoder to attempt to decode a message of length equal to the known pre-encoded and post-encoded wake-up message length(s) [aforementioned parameters L1 and L2]. A single length L1 may used in the system for wake-up messages to reduce the blind decoding complexity at the UE receiver. One or more possible values of L2 may be implemented. Whilst restriction of L2 to one length may help to further reduce the number of blind decoding attempts, this restriction may also remove the possibility to vary the strength of the applied FEC for a fixed L1. Hence to retain some flexibility in the applied FEC strength, more than one value of L2 may be implemented.

Blind decoding complexity may be reduced (vs. current LTE connected mode behavior) due to the fact that the UE 145 may not check other L1 (and possibly L2) message lengths in the PDCCH 506 for DL/UL assignments and hence the blind decoding complexity may be reduced. The blind decoding operation may also check one or more known locations (sets of time/frequency resources) within the PDCCH region 506 for the presence of the wake-up message. A reduced number of known locations may be used to minimize or otherwise reduce the computational complexity associated with the blind decoding operation. For example, the UE 145 may include information that the system may transmit wake-up messages on a restricted sub-set of time/frequency regions within the PDCCH 506. In this case, the UE 145 may not search for wake-up messages in other time/frequency locations within the PDCCH 506 outside of the identified resources.

An additional possibility is that the particular time/frequency resources (within the PDCCH 506) on which a wake-up message is transmitted, may be used to identify a sub-set of users to whom the message is addressed. For example, a sub-set "A" of UEs 145 may be configured to search for wake-up messages transmitted on time/frequency resource set #1, whereas sub-set "B" of UEs 145 may be configured to search for wake-up messages transmitted on time/frequency resource set #2. The eNB 150 may send wake-up messages on either (or both) of the resource sets depending on which selected UEs 145 the eNB wishes to address. In this case, the same w-RNTI may be used for each set of users as the message location may identify which set of users is being addressed. The search space is not common to all users, nor is it specific to one user. Instead, the search space may be common to a sub-set of users.

In a more generic case where different groups of users search the same candidate wake-up message locations, multiple wake-up messages may use different w-RNTIs. If a valid PDCCH message 508 associated with the UE's w-RNTI is detected or otherwise identified, the UE 145 may proceed to determine the value of its particular wake-up indicator. If the indicator is not transmitted, or its value does not correspond to a positive wake-up indication, the UE 145 may execute no further processes and returns to its DRX duty cycle, remaining in the CMDS sub-state and checking for further wake-up messages 508 at the next non-DRX'd sub-frame of the configured DRX cycle. If the value of the indicator does correspond to a positive wake-up indication, the UE 145 may activate the UE receiver to receive signals within the sub-frame beginning "M" sub-frames after the start of sub-frame K (the sub-frame in which the PDCCH wake-up message 508 was detected). "M" is therefore the "wake-up delay" 510 expressed in sub-frame units. By means of example, the illustrated value of M is equal to 2, although it will be appreciated that various values of M may be used without departing from the scope of the disclosure. During the process, the UE and the eNB may maintain the same information as to the value of M.

"M" may be the same value for all UEs 145 or may be different values per-UE. If a common value for M is used across UEs 145, and this value may be a variable parameter, the value may be signaled by the network to all UEs 145 via common signaling. Alternatively or in combination, the value of M may be different values for each UE, which may assist in resolving scheduler blocking issues in the time window following a sub-frame in which multiple users were woken up. Such UE-specific values of M may be explicitly signaled or assigned to the UE 145 by the eNB 150 (such as via RRC signaling, or even within the wake-up message itself—this may include multiple bits per wake-up indicator to signal the value of M to the UE 145), or may be implicitly derived based upon a user ID such as an RNTI, IMSI or TMSI. Different protocol layers (e.g. RRC, MAC, L1) may be used to signal M.

As an extension to this principle, the UE 145 may also be configured with a further parameter Z, and may configure the UE receiver to actively receive a defined "window" of sub-frames of length Z following receipt of a positive wake-up indication. For example, the window may comprise the Z sub-frames from (K+M) to (K+M+Z−1). In doing so, the eNB 150 may distribute the pending PDSCH transmissions to multiple simultaneously-woken UEs within the time window of Z sub-frames, rather than being restricted to addressing all UEs PDSCH assignments within a time window of just one sub-frame. Hence, scheduler blocking issues may be alleviated. In the illustrated implementation, Z=1.

Following transmission of the wake-up message 508 in sub-frame K, the eNB 150 may then determine that the UE 145 will receive the (K+M)th sub-frame and then transmit a PDSCH assignment message 512 during the PDCCH region 514 and to transmit the DL data during the PDSCH region 516 of the sub-frame. The PDSCH assignment 512 may be transmitted in the PDCCH region 514 of sub-frame K+M and uses a UE-specific RNTI (such as C-RNTI) as per normal connected mode operation in LTE. The inactivity timer 518 may be restarted in sub-frame K+M due to the presence of the DL assignment and the timer may continue to run in this example for 2 further sub-frames (the length of the DRX inactivity timer 518). In this example, no further data may be communicated during those sub-frames and the UE 145 may hence return either to a long or short DRX sub-state (subsequently to the CMDS sub-state if inactivity continues) or directly to the CMDS sub-state (if the system is configured to allow this direct transition).

Figure 6A:
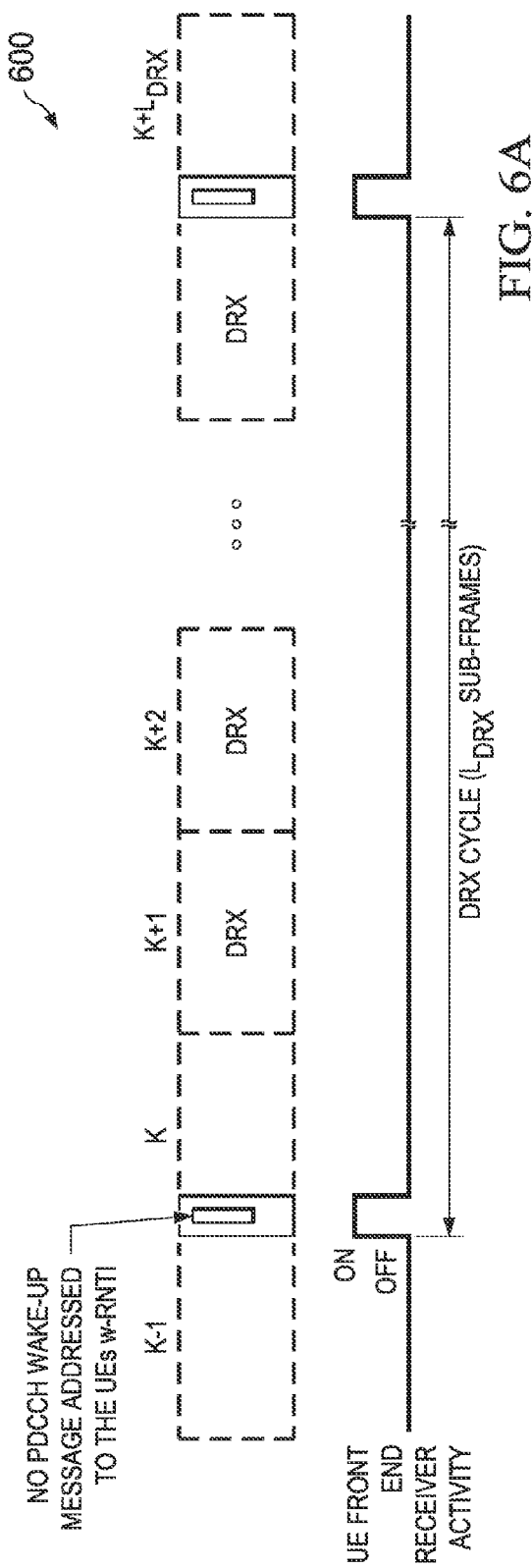
Figure 6C:
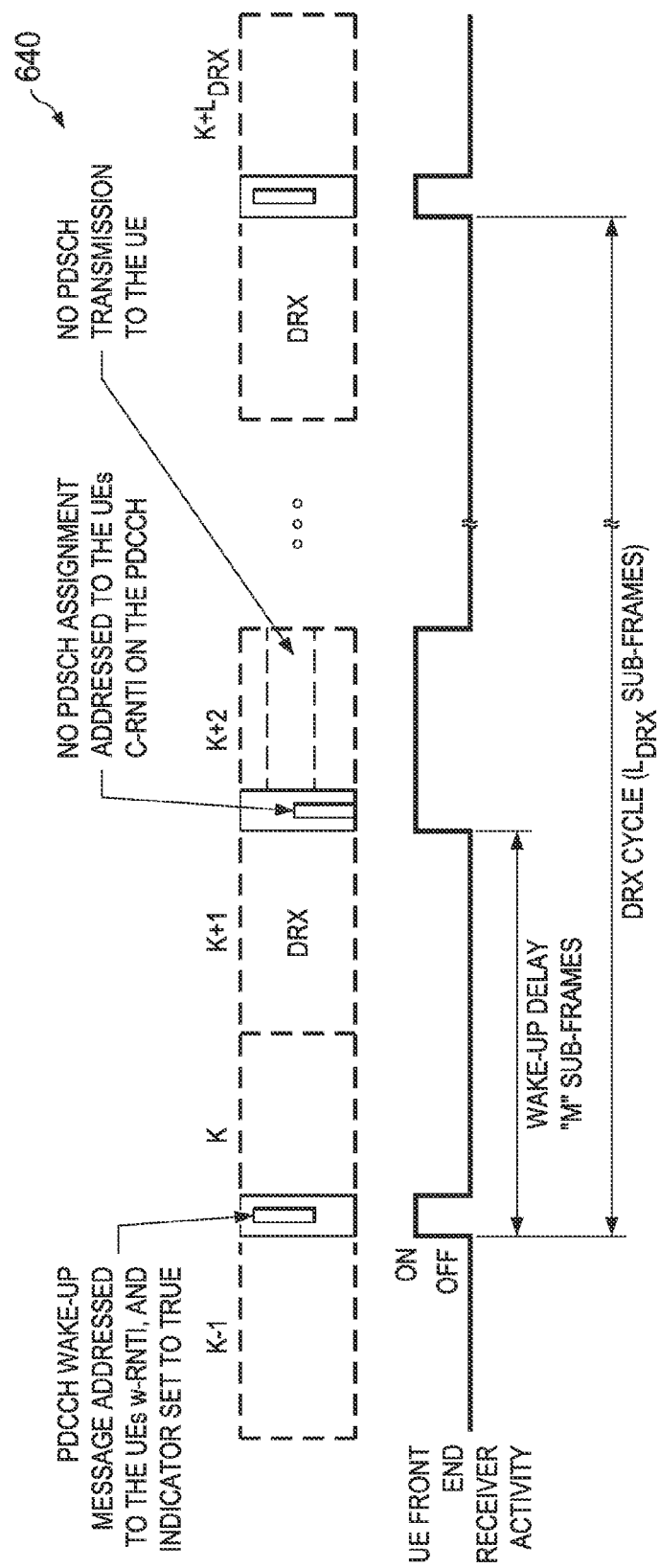

FIGS. 6A-C are schematic diagrams 600, 620, and 640 illustrating sequences when no data is transmitted. In particular, diagram 600 illustrates when sub-frame K does not contain a PDCCH wake-up message addressed to the UEs w-RNTI. In this event, the UE 145 may not receive sub-frame K+M, and the UE 145 may return to the DRX cycle and receives the PDCCH region of sub-frame K+LDRX to check once again for the presence of a valid wake-up indicator. Diagram 620 illustrates a process when sub-frame K does contain a PDCCH wake-up message addressed to the UEs w-RNTI, but the UE determines that the message indicates it should not wake-up. In this event, the UE 145 also may not receive sub-frame K+M. The UE 145 may return to its DRX cycle and receive the PDCCH region of sub-frame K+LDRX to check once again for the presence of a valid wake-up indicator. Diagram 640 illustrates a process when sub-frame K does contains a PDCCH wake-up message addressed to the UEs w-RNTI and the UE interprets that the message indicates that it should wake-up. This may be a result of the eNB 150 attempting to wake-up another UE 145b and the particular formatting of the wake-up message may not have allowed for this to occur without also waking up this UE 145a (e.g., multiple UEs share the same indicator). In this (false-alarm) event, the UE 145 may receive sub-frame K+M but may not identify a PDSCH assignment message addressed to it within the PDCCH region of that sub-frame. The UE returns to its normal DRX cycle of operation and will receive the PDCCH region of sub-frame K+LDRX to again check for the presence of a valid wake-up indicator. As has been previously described, the PDCCH processing complexity during the actively-received sub-frames may also be reduced when compared to the case of current LTE connected mode operation by virtue of the fact that the number of blind decodes may reduced. The resulting reduction in UE battery drain may provide for extended times between battery recharges, or may enable the network to set shorter DRX cycle times whilst preserving the same time between UE battery recharges. These shorter DRX cycle times may in-turn offer reduced latency, and improved user experience and system performance.

A wake-up message in the PDCCH region may comprise $L_W$ information bits in addition to $L_{CRC}$ bits for the CRC/RNTI such that $L_1=L_W+L_{CRC}$. In general, the CRC appended to a DCI format message may comprise a Cyclic Redundancy Check computed over the length $L_W$ of the DCI format and this may subsequently be bitwise exclusive-OR'd (XOR'd) with a 16-bit RNTI value such as a w-RNTI, a C-RNTI, a P-RNTI, an RA-RNTI, an SPS-RNTI or an SI-RNTI. The PDCCH wake-up message length(s) may be arranged to be equal to the lengths of pre-existing DCI formats in the LTE system. In this way, the message lengths may be compatible with the existing LTE physical layer thereby minimising or otherwise reducing the need for redesign when accommodating the proposed wake-up message functionality on PDCCH.

Table 1 lists example sizes (in bits) of the existing DCI formats 1C and 3/3A. $L_1$ is the length in bits of the DCI format with a 16-bit CRC and $L_W$ is the length in bits of the DCI format without the 16-bit CRC. The value $N_{RB}$ denotes the number of 180 kHz resource blocks defined within the system bandwidth. The use of PDCCH wake-up message lengths other than those shown in Table 1 is not precluded.

TABLE 1

Sizes (in bits) of existing DCI formats 1C and 3/3A

| System BW | $N_{RB}$ | DCI format 1C | | DCI format 3/3A | |
| --- | --- | --- | --- | --- | --- |
| | | Without CRC ($L_W$) | With CRC ($L_1$) | Without CRC ($L_W$) | With CRC ($L_1$) |
| 1.6 MHz | 6 | 8 | 24 | 20 | 36 |
| 3 MHz | 15 | 10 | 26 | 22 | 38 |
| 5 MHz | 25 | 12 | 28 | 24 | 40 |
| 10 MHz | 50 | 13 | 29 | 26 | 42 |
| 15 MHz | 75 | 14 | 30 | 27 | 43 |
| 20 MHz | 100 | 15 | 31 | 28 | 44 |

A PDCCH wake-up message instance is defined as a PDCCH transmission on a particular sub-frame and using a particular w-RNTI. The $L_W$ information bits within a PDCCH wake-up message allow for one of up to $N_{cw}=2^{L_W}-1$ possible wake-up codewords to be transmitted for that instance.

A number ($N_{UE}$) of UEs may be configured to listen to the PDCCH wake-up message instance and to each decode the transmitted wake-up codeword. Each UE may decode the codeword in order to extract wake-up information of relevance to that UE (for example, to determine whether or not it should wake-up).

FIG. 7 is a codeword system 700 that shows a set of wake-up indicators 702a-m (one for each of the $N_{UE}$ UEs) being encoded by the eNB 150 in order to produce a wake-up codeword of length $L_W$ bits 703. The codeword may be subject to appropriate forward error correction encoding prior to transmission. This correction may comprise CRC attachment and convolutional encoding in which: for each codeword (i.e. wake-up message) a CRC may be calculated over the $L_W$ bits it contains; the CRC may be appended to the data after being scrambled using a specific wake-up RNTI (w-RNTI); and convolutional encoding may be performed on the concatenated sequence comprising the codeword and CRC bits.

The transmitted PDCCH wake-up message instance is subsequently received by a plurality of UEs. Following appropriate forward error correction decoding of the PDCCH, each UE is then in possession of the same $L_W$ decoded PDCCH bits comprising the received wake-up codeword. Each UE decodes the codeword in order to determine the value of the wake-up indicator 704a-m of relevance to that particular UE. Thus, the step of codeword decoding may be specific to each UE.

In general, the wake-up indicators for each UE may be binary or multi-valued. For example, a binary indicator may be used to simply indicate "wake-up" or "do no wake-up". Multi-valued indicators may allow for the carriage of additional information to the UE, and to provide further functionality or flexibility. For example, a multi-valued indicator may be used to indicate "wake-up in M sub-frames time" where the value of M is signalled within the indicator value.

A large variety of possibilities exist regarding how the indicators are mapped to wake-up codewords on the PDCCH. The mappings may be designed to optimise particular performance attributes of the communication scheme. Such performance attributes may include: wake-up messaging capacity (e.g., attempt to maximise the number of UEs that may be addressed via a single PDCCH wake-up codeword); false alarm probability (e.g., attempt to minimise the probability that a UE incorrectly interprets a transmitted wake-up codeword to mean it should wake-up, when such action was not intended by the eNB); wake-up message communication reliability (e.g., using a repetition or block code to produce multiple bits per indicator prior to the existing FEC encoding operation—this may be used to further increase the level of FEC protection).

FIGS. 8A-D illustrates example mappings 800, 820, 840, and 860 between codewords and positions or values of wake-up indicators. In these examples, the PDCCH wake-up message length is selected to be $L_W=13$ bits, equal to the length of DCI format 1C for an LTE system with 10 MHz system bandwidth. FIG. 8A shows a first (and simple) example codeword mapping 800 in which each indicator is binary valued and is mapped exclusively to a single bit position (1 ... $L_W$) within the wake-up codeword. This results in $N_{UE}=13$ UEs that may be associated with the same PDCCH wake-up message instance. In this implementation, multiple PDCCH message instances may exist within the same sub-frame, these being distinguished by means of their differing w-RNTIs. A total of 2 w-RNTIs are shown, and therefore a total of $2 \times N_{UE}=26$ users may receive wake-up indicators within the same sub-frame.

FIG. 8B shows a second example codeword mapping 620 in which each of the UE indicators is again binary valued. In this example however, bit "i" within the codeword is set based upon a logical OR of $N_{share}=4$ UE indicators. More specifically, in this example bit "i" is set based on an OR of the indicators for UEs: $\{i, i+L_W, i+2L_W, i+3L_W\}$. Thus, if any one of the UEs need to be woken-up, all 4 UEs associated with the same indicator will actually be woken-up regardless of whether they too should have been woken (i.e. this scheme carries a risk of false-alarm wake-up). The figure again shows that multiple PDCCH wake-up message instances may exist within the same sub-frame, these being distinguished by means of their differing w-RNTIs. A total of 2 w-RNTIs are shown, and therefore a total of $2 \times N_{share} \times N_{UE}=104$ users may receive wake-up indicators within the same sub-frame. The scheme is extensible to other values of $N_{share}$.

FIG. 8C shows a third example codeword mapping, in which each of the UE indicators is again binary valued. The mapping of the UE indicators to the wake-up codeword is more complex in this example. In a first step, the indicator for the $n^{th}$ UE (each of $N_{UE}$ UEs) is first associated with an intermediate codeword $C_n$. $C_n$ is of length $L_W$ bits. If the UE indicator is set FALSE (i.e. "do not wake-up"), $C_n$ is a vector of $L_W$ zero's. If the indicator is set TRUE, $C_n$ is set to a UE-specific vector $V_n$ of $L_W$ bits, constrained such that only $N_0$ of the bits in $V_n$ are set TRUE. Second, the final codeword $C_{final}$ of length $L_W$ bits is constructed via a logical bitwise OR operation across all of the $N_{UE}$ intermediate codewords ($C_n$) formed in the first step. Thus, with "i" indicating the bit position, $C_{final}(i)=(C_1(i)|C_2(i)|C_3(i) \ldots |C_{Lw}(i))$. The above represents one implementation of this scheme. It shall be appreciated that this implementation is not limiting and that the same result may be achieved via other implementations. For example, the scheme may be alternatively expressed as: each UE for which the UE indicator is to be set TRUE is associated with $N_0$ bit positions within the codeword of length $L_W$ bits; and bits within the final codeword $C_{final}$ of length $L_W$ bits are set TRUE if they correspond to any of the bit positions associated with the UEs for which the UE indicator is TRUE. In the example of FIG. 8C, $N_0=2$ for all UEs. Different values of $N_0$ for different UEs are also possible. For example the $N_0$ for a particular UE could vary depending on the likelihood of a positive wake-up indication being sent to that UE; i.e. a UE that receives data infrequently (and is thus less likely to receive a positive wake-up indication) could use a larger value of $N_0$ than a UE that receives data more frequently (and is thus more likely to receive a positive wake-up indication). When decoding the received codeword, each UE checks to see whether ALL of the non-zero bit positions associated with its $V_n$ are set to TRUE. Only if all of these bit positions are set to TRUE will the UE wake-up. For example, to carry out this operation, the UE may mask the $L_W$ received bits with the known $V_n$ codeword that is specific to this UE. The masking operation is typically a bitwise AND operation of the received codeword ($C_{final}$) with $V_n$. If the sum of the number of bits that are set TRUE in the resulting masked codeword is equal to $N_0$, the UE interprets this as a positive wake-up indication, otherwise the UE interprets the received codeword as a negative wake-up indication. In this third example, in order to minimise or otherwise reduce the false alarm probability, the positions of any non-zero bits in $V_n$ for this UE preferably overlap as little as possible with the positions of any potential non-zero bits in $V_n$ for other UEs. If there is no overlap, there is zero false alarm probability. However, the probability of false alarm may be a function of: the proportion of wake-up indicators set to TRUE this wake-up instance (within the set of $N_{UE}$); the value of $N_{UE}$; the value of $N_0$; and the length $L_W$. That is, variations in the above affect the probability that certain combinations of UEs with a positive wake-up indication correspond (unintentionally) to a positive decoded wake-up indication for another UE. The eNB may individually signal the $V_n$ codeword itself (or equivalently the positions of the non-zero bits within $V_n$) to each of the relevant UEs. Alternatively, $V_n$ may be derived (by the eNB and by the UE) by means of a hashing function or other computational or algorithmic means. The hashing function or other computational or algorithmic means may require input of the value $L_W$ and of a UE ID (such as a pre-existing C-RNTI, a TMSI or an IMSI), and may output $V_n$ codeword values of length $L_W$, or equivalently, the bit positions within $V_n$.

FIG. 8C shows two w-RNTI in use, with $N_{UE}=30$ for the first w-RNT$_1$ and $N_{UE}=20$ for the second w-RNTI (thus wake-up indicators may be sent to up to 50 UEs within the same sub-frame). In the particular example shown, $V_n$ for the UEs shown would equal:

UE 1, $V_n$=[1 0 0 1 0 0 0 0 0 0 0 0]
UE 2, $V_n$=[0 1 0 0 0 1 0 0 0 0 0 0]
UE 3, $V_n$=[0 0 0 1 0 0 0 1 0 0 0 0]
UE 30, $V_n$=[0 0 0 0 0 0 0 1 0 0 0 1]
UE 31, $V_n$=[1 0 0 0 0 1 0 0 0 0 0 0]
UE 32, $V_n$=[0 1 0 1 0 0 0 0 0 0 0 0]
UE 33, $V_n$=[0 0 1 0 0 1 0 0 0 0 0 0]
UE 50, $V_n$=[0 0 0 0 0 0 0 0 1 0 1 0 0]

$N_{UE}$ may take a range of values depending upon the desired false alarm probability and the desired wake-up message capacity. It will be appreciated that use of only a single w-RNTIs is also possible.

FIG. 8D shows a fourth example codeword mapping, in which each of the UE indicators is again binary valued. The mapping of the UE indicators to the wake-up codeword follows the steps outlined for the third example of FIG. 8C. However, in this case, the value of $N_0$ used for a given PDCCH wake-up message is signalled by means of the w-RNTI used to transmit the message. The mapping 860 illustrates two sub-frame instances with a single PDCCH wake-up message per sub-frame. This scheme differs from that of FIG. 8C in that the w-RNTI used for PDCCH wake-up message transmission is not used to distinguish multiple PDCCH messages within the same sub-frame, but is instead used to signal to the UEs, the value of $N_0$ that is in use for this sub-frame. This allows the eNB to adjust the false alarm probability depending on the number of UEs that have a positive page indication within a PDCCH wake-up message.

In the illustrated implementation, w-RNTI #1 in the first sub-frame instance is used to indicate that a value of $N_0=2$ is in use, whilst in the second sub-frame instance, the (different) w-RNTI #2 is used to indicate that a value of $N_0=3$ is in use. The UEs receiving the PDCCH wake-up message first determine the w-RNTI value that has been used, and use this to look-up a corresponding value of $N_0$. The UEs then configure their codeword decoders (and determine or select $V_n$) in accordance with the determined value of $N_0$. $N_{UE}=20$ is shown for each of the two PDCCH wake-up message instances.

This ability to dynamically vary $N_0$ on a per sub-frame basis may be used by the eNB in order to optimise the false alarm probability based upon its knowledge of how many UEs will have a positive wake-up indicator set within this PDCCH wake-up message. The eNB is able to count the number of UEs that will be falsely woken-up for different values of $N_0$ and may select the value of $N_0$ that results in the lowest number of falsely woken-up UEs.

As an optional feature, the eNB may decide not to transmit the wake-up message at all (i.e. DTX), in the event that no positive wake-up indicators are transmitted for any of the UEs associated with a PDCCH wake-up message instance. By doing so, the eNB may be able to save power and transmission resources and to use these for other (non-wake-up-related) transmissions.

Figure 9:
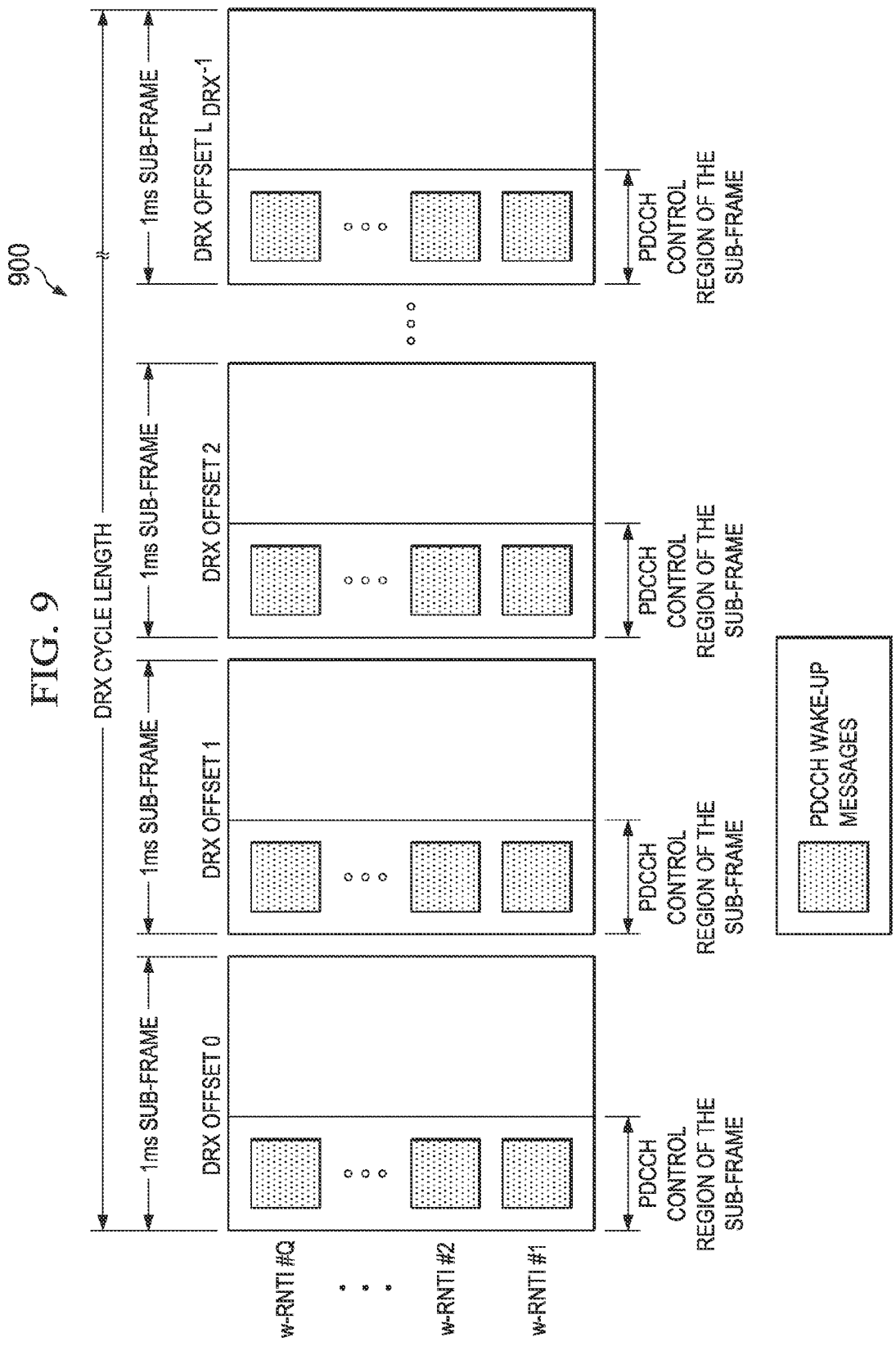
FIG. 9 is a schematic diagram illustrating time domain multiplexing of wake-up messages within a DRX cycle length.

FIG. 9 is a schematic diagram 900 illustrating time domain multiplexing of wake-up messages within a DRX cycle length (of $L_{DRX}$ sub-frames). As previously mentioned, a PDCCH wake-up instance may be defined in terms of a sub-frame instance and a particular w-RNTI. Given that UEs listening for the wake-up indicators would typically be assigned a DRX cycle (and a DRX sub-frame offset for that DRX cycle, defining which sub-frames the UE actively listens for wake-up messages), time-domain multiplexing of PDCCH wake-up instances (and hence of UE indicators) is also possible. This may be used to increase the number of available wake-up indicators in the system. For example, each CMDS UE in the system may be associated with at least a triplet of parameters comprising {DRX sub-frame offset, w-RNTI, and UE indicator position within the PDCCH wake-up message}.

In this example, a total of "Q" w-RNTIs are reserved in the system for wake-up messages. The DRX cycle length is configured to be $L_{DRX}$ sub-frames in duration, and each wake-up message comprises $N_{UE}$ wake-up indicators (these being mapped to wake-up codewords of length $L_W$ bits as previously described in FIG. 7). In such a configuration, the maximum number of supportable CMDS users is equal to:

$$N_{CDMS} = Q \times N_{UE} \times L_{DRX}$$

For example, assuming a DRX cycle length $L_{DRX}=320$, Q=2, and $N_{UE}=13$, the number of users that may be supported (per cell) in the CDMS sub-state is 8320.

In general, not all sub-frames of the DRX cycle may be used for potential wake-up messages. It is also possible to employ wake-up messages with increased payload sizes (e.g. larger $L_W$ or larger $N_{UE}$) but which are available on only a sub-set of the sub-frames within the DRX cycle. For example, the same number of 8320 CMDS users per cell could be supported using DCI format 3/3x ($L_W=26$ bits for 10 MHz system bandwidth) and with $N_{UE}=26$, but with wake-up messages possible on only half of the sub-frames within the same 320 sub-frame DRX cycle. Assuming a fixed probability (per-sub-frame duration) that data arrives for a UE (therefore needing to be woken up at the next available opportunity), this has the effect of increasing the average number of UE indicators that need to be set to TRUE per PDCCH wake-up message instance and hence the total number of wake-up messages that need to be transmitted may be reduced without extending the DRX cycle length for each user. In general, the system may be optimised by adjusting one or more of: the UE indicator capacity of the PDCCH wake-up message ($N_{UE}$) [this may be further dependent on $L_W$, $N_0$, $N_{share}$]; the number of w-RNTIs; the DRX cycle length ($L_{DRX}$); and the allocation of DRX sub-frame offsets to users (and hence the fraction of all sub-frames that may be used for wake-up message opportunities).

Figure 10:
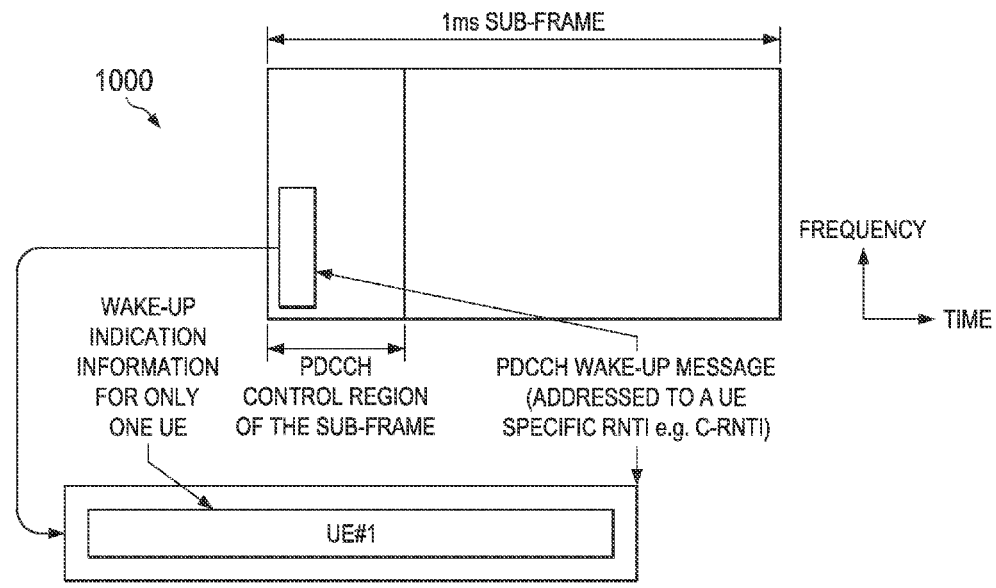
FIG. 10 is a schematic diagram that illustrates a single-user wake-up message addressed to a UE-specific RNTI.

FIG. 10 is a schematic diagram 1000 that illustrates a single-user (dedicated) wake-up message addressed to a UE-specific RNTI (e.g. a C-RNTI) and transmitted during the PDCCH region of a sub-frame. In this solution, a PDCCH message (DCI format comprising $L_W$ information bits) contains a dedicated wake-up signal specific for only one UE (this UE residing in the CMDS sub-state). The wake-up signal may take the form of a normal UL or DL assignment addressed to the UEs dedicated RNTI (i.e. C-RNTI). The eNB may transmit the dedicated wake-up message during the PDCCH region of any actively-received (non-DRX) sub-frame (as per the current LTE design). The distinction in this solution from the current LTE design however, is that the PDSCH associated with the DL assignment is delayed into another sub-frame (i.e. a time-gap still exists between the PDCCH wake-up and the PDSCH as per the previously-described multi-user wake-up solutions). As a result, a UE still need only activate its front-end receiver circuitry for the PDCCH region of each non-DRX sub-frame when in the CMDS sub-state (and may DRX the PDSCH region). Thus, in this solution, DL communications between an eNB and a UE may take one of two forms: (1) when in the CMDS sub-state, a DL assignment in the PDCCH region of sub-frame K is associated with a PDSCH transmission in sub-frame K+M (where the value of M is configured, dynamically signalled or pre-defined); and (2) when not in the CMDS sub-state, a DL assignment in the PDCCH region of sub-frame K is associated with a PDSCH transmission in the same sub-frame K (normal LTE operation).

Systems are known in the prior art in which a time-gap (or time-slot or sub-frame gap) exists between a DL assignment and the transmission of the associated DL data. For example, the FDD UMTS HSDPA system comprises a control channel termed the HS-SCCH and a DL data channel termed the HS-PDSCH. Both the HS-SCCH and the HS-PDSCH are 2 ms (3 timeslots) in duration, yet the HS-PDSCH starts 2 timeslots after the start of the HS-SCCH. However, these known systems utilise a fixed time gap between the control channel and the associated data channel.

In the proposed solution of FIG. 10, the sub-frame time gap between the control (PDCCH) and the PDSCH (data) is variable between at least two values: (1) no time gap when not in a deeper sleep state (active UEs); and (2) a time gap of length M sub-frames when in a deeper sleep sub-state (inactive UEs). Thus, the low data transfer latency achievable with no time gap remains available for active UEs, whilst improved UE power/battery consumption is enabled for inactive UEs (at the expense of a small latency penalty for the first transmission upon exiting the sleep state).

Figure 11A:
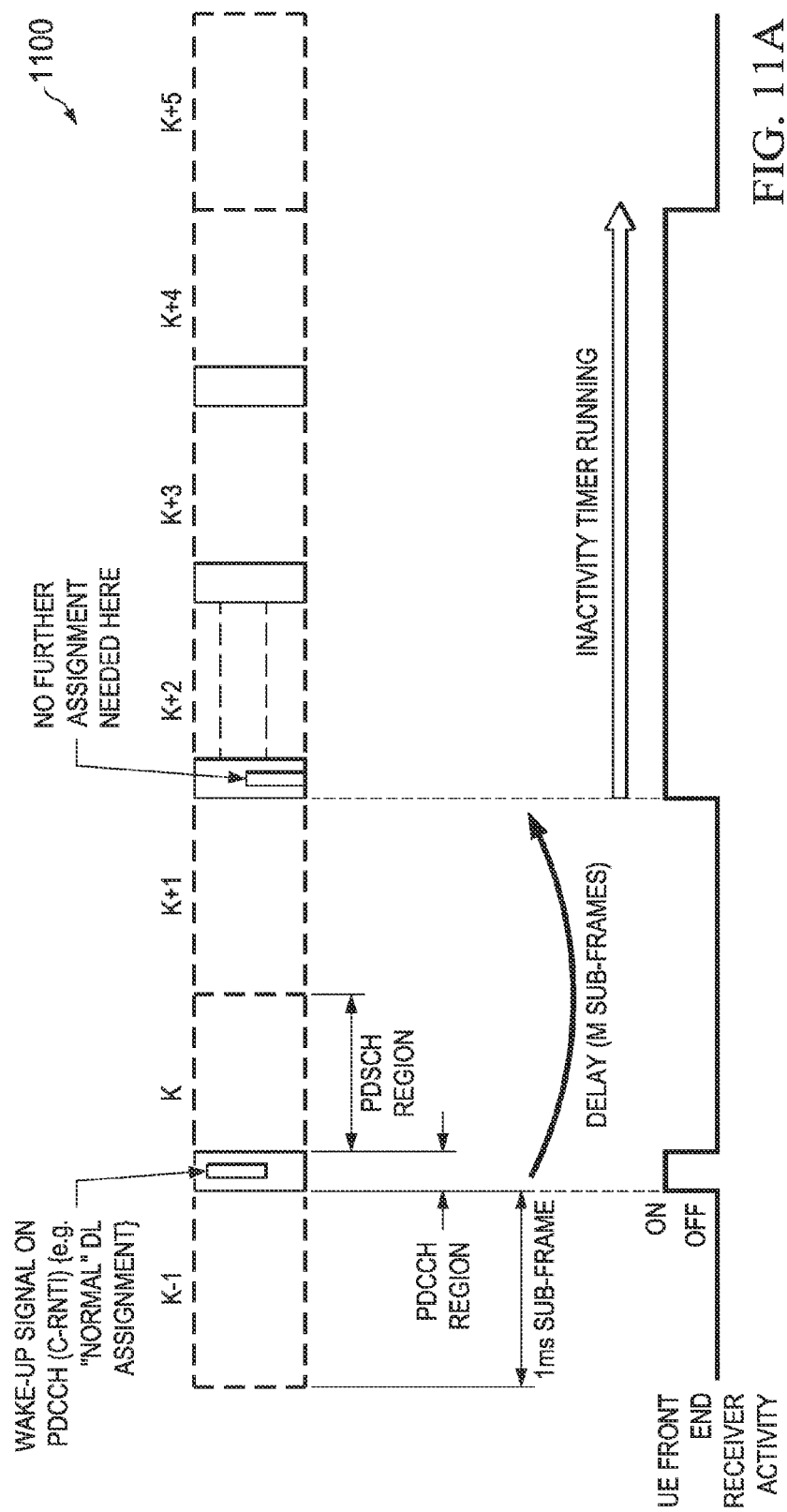
FIGS. 11A and 11B are schematic diagrams illustrating wake-up using normal DL assignment on PDCCH but with delayed PDSCH.
Figure 11B:
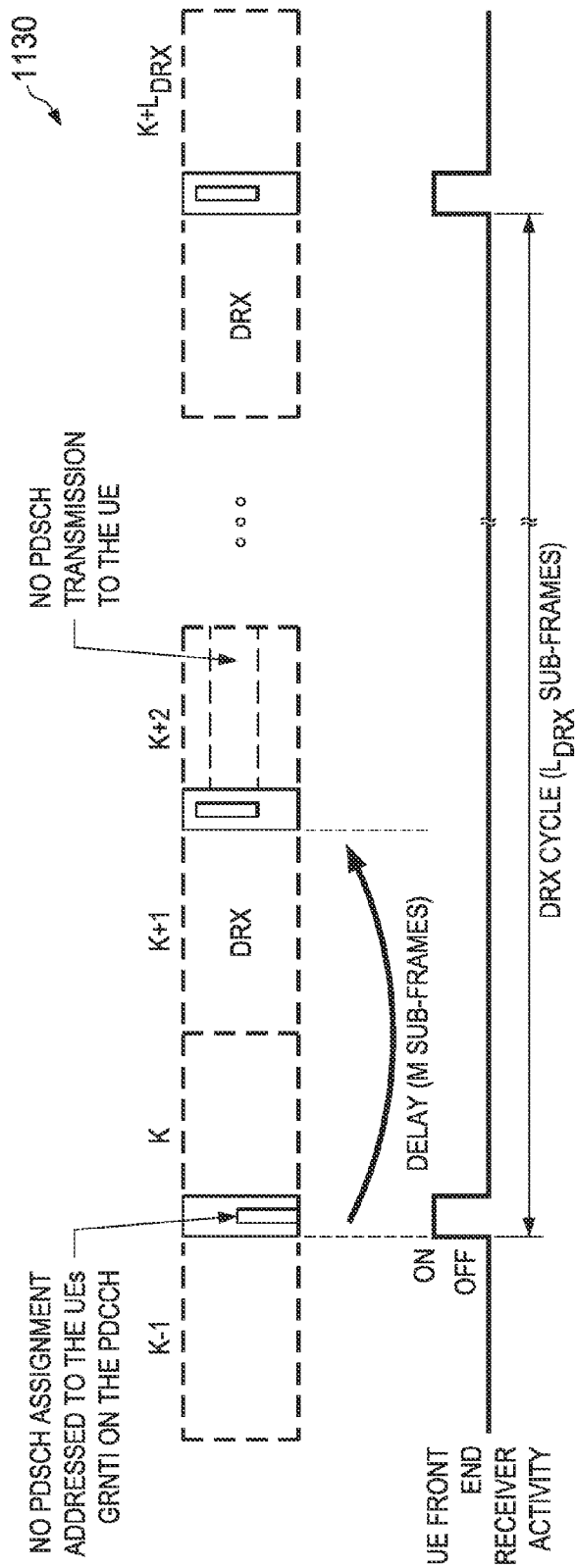

FIGS. 11A and 11B are schematic diagrams 1100 and 1130 illustrating wake-up using normal DL assignment on PDCCH but with delayed PDSCH. The diagram 1145 illustrates a CMDS UE searching for such a wake-up message on C-RNTI during non-DRX sub-frame K. The wake-up signal is effectively a normal DL (or potentially UL) assignment on PDCCH, and is sent using the UE-specific C-RNTI. However, the associated PDSCH transmission is delayed by M sub-frames (note that M could be any of a fixed value, a configurable value common amongst UEs, or a UE-specific value in the same ways as previously described for the multi-user wake-up solutions). Because the wake-up signal sent on the PDCCH of sub-frame K is effectively the same as a normal DL assignment message, it therefore contains the parameters that are needed to describe the physical resources and formatting of the forthcoming PDSCH transmission (but here on sub-frame K+M rather than on sub-frame K). Thus, in sub-frame K, a valid DL assignment message is detected by the UE and this is used as a trigger to wake up from the CMDS sub-state and to return to normal operation and the associated PDSCH transmission is delayed until sub-frame K+M.

When in the UE is in the CMDS sub-state (as it is in this example during sub-frame K), the UE may interpret reception of the C-RNTI assignment message on the PDCCH in sub-frame K as a "delayed" assignment and may subsequently execute data reception procedures as if a normal C-RNTI assignment message had been received in sub-frame K+M. That is, from sub-frame K+M onwards, the UE may "act" in the same way as a non-CMDS UE would have if it had received a normal C-RNTI assignment.

Depending on the system design, the DRX inactivity timer may be restarted either at sub-frame K (due to the presence of the initial C-RNTI assignment message on the PDCCH), or at sub-frame K+M (due to the presence of the PDSCH or because the UE is acting "as if" it had received an assignment message on sub-frame K+M). It is the latter case that is shown in FIG. 11A in which the timer then continues to run for a further 2 sub-frames (the length of the DRX inactivity timer).

The UE therefore receives the PDSCH in sub-frame K+M and restarts the DRX inactivity timer as would be the case for any normally-received PDSCH transmission. In this example, the DRX inactivity timer duration is set to 2 sub-frames (meaning that two further sub-frames beyond sub-frame K+M are received if no further data activity takes place). Note that the PDCCH in sub-frame K+M need not necessarily contain a DL assignment for the UE as this has already been received in sub-frame K. Preferably however, the eNB should not make a DL assignment (using the same PDCCH resources) to another UE in sub-frame K+M in order to avoid the potential for collision of ACK/NACK transmissions from two UEs on PUCCH uplink resources that are linked to the PDCCH resources used for the DL assignments. This does not preclude the eNB from sending other control messages (not DL assignments) to the UE (or another UE) during the PDCCH region of sub-frame K+M, or from sending a DL assignment that 'overwrites' that received in sub-frame K.

After sub-frame K+M, subsequent DL transmissions to the UE on an arbitrary sub-frame (Y) whilst not in the CMDS sub-state would be made using a DL assignment during the PDCCH region of sub-frame Y and an associated PDSCH transmission within the same sub-frame. Thus, there is no further sub-frame time-gap between the PDCCH and the PDSCH so long as the UE is not in the CMDS sub-state.

In FIG. 11B, the diagram 1170 illustrates a situation in which a CMDS UE listens for a wake-up message using C-RNTI on sub-frame K, but a valid DL (or UL) assignment message is not detected (hence the UE determines it should remain in the CMDS sub-state). The UE sleeps until the next DRX cycle (sub-frame K+$L_{DRX}$) where it once again checks for the presence of a wake-up signal/DL or UL assignment using C-RNTI.

Figure 12:
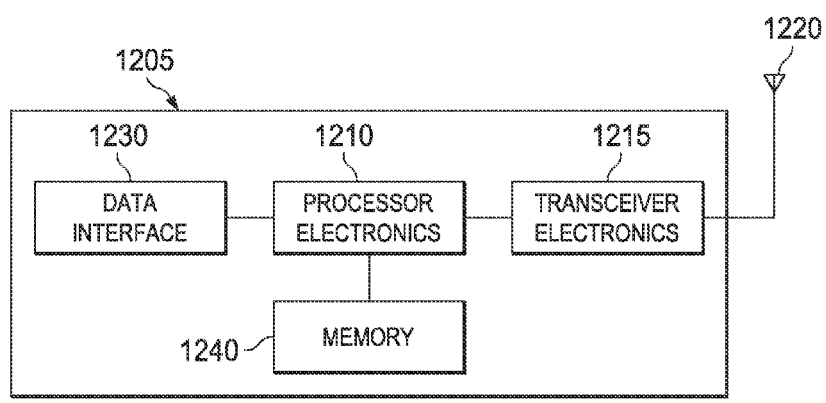
FIG. 12 shows an example of a radio station architecture

FIG. 12 shows an example of radio station architecture for use in a wireless communication system. Various examples of radio stations include base stations and wireless devices. A radio station 1205 such as a base station or a wireless device can include processor electronics 1210 such as a processor that implements one or more of the techniques presented in this document. A radio station 1605 can include transceiver electronics 1215 to send and receive wireless signals over one or more communication interfaces such as one or more antennas 1220. A radio station 1605 can include other communication interfaces for transmitting and receiving data. In some implementations, a radio station 1605 can include one or more wired network interfaces to communicate with a wired network. In other implementations, a radio station 1605 can include one or more data interfaces 1230 for input/output (I/O) of user data (e.g., text input from a keyboard, graphical output to a display, touchscreen input, vibrator, accelerometer, test port, or debug port). A radio station 1605 can include one or more memories 1240 configured to store information such as data and/or instructions. In still other implementations, processor electronics 1210 can include at least a portion of transceiver electronics 1215.

What is claimed:

1. A method for managing a receiver for user equipment (UE) in a Long Term Evolution (LTE) system, comprising:
   receiving within a Physical Downlink Control Channel (PDCCH) resource region of a first sub-frame, a message addressed to an Identifier (ID) associated with a group of user equipments (UEs), the message containing wake-up indicators for more than one of the UEs within the group of UEs, and a UE receiver is activated for between one and four Orthogonal Frequency Division Multiplexing (OFDM) symbols within the PDCCH resource region of the first sub-frame and at least partially deactivated for one or more of the remaining OFDM symbols of the first sub-frame; and
   receiving, based on the message, at least a portion of a second sub-frame, the second sub-frame occurring at a different time than the first sub-frame.

2. The method of claim 1, the method further comprising:
   decoding the PDCCH resource region to identify a wake-up message for the UE, the wake-up message configured to activate the UE receiver in the second sub-frame; and
   activating the UE receiver during the second sub-frame.

3. The method of claim 2, wherein activating the UE receiver during the second sub-frame includes activating the receiver for at least a portion of a PDCCH resource region of the second sub-frame.

4. The method of claim 2, wherein activating the UE receiver during the second sub-frame includes activating the receiver for at least a portion of a Physical Downlink Shared Channel (PDSCH) resource region of the second sub-frame.

5. The method of claim 2, wherein activating the UE receiver during the second sub-frame includes activating the receiver for at least a portion of PDCCH resource region of the second sub-frame and for at least a portion of a PDSCH region of the second sub-frame.

6. The method of claim 2, wherein the wake-up message identifies a number of sub-frame durations between the first and second sub-frames.

7. The method of claim 1, wherein the message within the PDCCH resource region of the first sub-frame is conveyed using at least one of a Downlink Control Information (DCI) format 1C or 3/3A.

8. The method of claim 1, further comprising receiving, prior to the first sub-frame, an explicit message from an eNodeB (eNB), instructing the UE to transition to a discontinuous reception (DRX) state or sub-state, the DRX state or sub-state comprising a set of defined non-DRX sub-frame instances during which the UE is not required to receive signals within a PDSCH resource region of the non-DRX sub-frames.

9. The method of claim 8, further comprising transmitting, prior to receiving the explicit message, a request to the eNB to transition to the DRX state or sub-state in response to the UE identifying a trigger event.

10. The method of claim 8, wherein the UE receives the explicit message independent of initially transmitting a request to the eNB.

11. The method of claim 8, further comprising transmitting, to the eNB, an acknowledgement indicating a transition to the DRX state or sub-state.

12. The method of claim 1, wherein the ID comprises at least a Radio Network Temporary Identifier (RNTI) associated with the UE.

13. The method of claim 12, wherein the RNTI is indicative of a number of wake-up indicators.

14. The method of claim 12, further comprising determining a number of wake-up indicators for the UE included in the message, the number of wake-up indicators being determined based upon the wake-up RNTI used to transmit the message.

15. The method of claim 12, wherein the RNTI is a C-RNTI.

16. The method of claim 12, wherein the RNTI is associated with a group of UEs including the UE.

17. The method of claim 12, further comprising, determining the presence of the message communicating the RNTI, decoding a wake-up indicator communicated within the message, and determining that the wake-up indicator is set to a positive wake-up value for the UE.

18. The method of claim 17, wherein the wake-up indicator set to a positive wake-up value is a downlink or uplink assignment message.

19. The method of claim 17, wherein decoding the wake-up indicator comprises:
   decoding the message to identify a codeword and
   decoding the codeword using an algorithm assigned to the UE.

20. User Equipment (UE) for managing a UE receiver in a Long Term Evolution (LTE) system, comprising:
   memory for buffering control information and data traffic;
   one or more processors configured to:
      receive a first message within a Physical Downlink Control Channel (PDCCH) resource region of a first sub-frame, the first sub-frame designated as a non-discontinuous reception (non-DRX) sub-frame in a DRX cycle, the first message identifying an Identifier assigned to a plurality of different User Equipments (UE), a Physical Downlink Shared Channel (PDSCH) of the first sub-frame absent of data traffic for the UE;
      receive, based on the message received during the PDCCH resource region of the first sub-frame, at least a portion of a second sub-frame, the second sub-frame occurring at a different time to the first sub-frame; and
      wherein a UE receiver is activated for between one and four Orthogonal Frequency Division Multiplexing (OFDM) symbols within the PDCCH resource region of the first sub-frame and at least partially deactivated for one or more of the remaining OFDM symbols of the first sub-frame.

21. The UE of claim 20, the processors further configured to:
   decode the PDCCH resource region to identify a wake-up message for the UE, the wake-up message configured to activate the UE receiver in the second sub-frame; and
   activate the UE receiver during the second sub-frame.

22. The UE of claim 21, wherein the processors configured to activate the UE receiver during the second sub-frame includes the processors configured to activate the receiver for at least a portion of a PDCCH resource region of the second sub-frame.

23. The UE of claim 21, wherein the processors configured to activate the UE receiver during the second sub-frame includes the processors configured to activate the receiver for at least a portion of PDSCH resource region of the second sub-frame.

24. The UE of claim 21, wherein the processors configured to activate the UE receiver during the second sub-frame includes the processors configured to activate the receiver for at least a portion of PDCCH resource region of the second sub-frame and for at least a portion of a PDSCH region of the second sub-frame.

25. The UE of claim 21, wherein the wake-up message identifies a number of sub-frame durations between the first and second sub-frames.

26. The UE of claim 20, wherein the message within the PDCCH resource region of the first sub-frame is conveyed using at least one of a Downlink Control Information (DCI) format 1C or 3/3A.

27. The UE of claim 20, the processors further configured to receive, prior to the first sub-frame, an explicit message from an eNodeB (eNB), instructing the UE to transition to DRX state or sub-state, the DRX state or sub-state comprising a set of defined non-DRX sub-frame instances during which the UE is not required to receive signals within a PDSCH resource region of the non-DRX sub-frames.

28. The UE of claim 27, the processors further configured to transmit, prior to receiving the explicit message, a request to the eNB to transition to the DRX state or sub-state in response to the UE identifying a trigger event.

29. The UE of claim 27, wherein the UE receives the explicit message independent of initially transmitting a request to the eNB.

30. The UE of claim 27, the processors further configured to transmit, to the eNB, an acknowledgement indicating a transition to the DRX state or sub-state.

31. The UE of claim 20, wherein the ID comprises at least a Radio Network Temporary Identifier (RNTI) associated with the UE.

32. The UE of claim 31, wherein the RNTI is indicative of a number of wake-up indicators.

33. The UE of claim 31, the processors further configured to determine a number of wake-up indicators for the UE included in the wake-up message, the number of wake-up indicators being determined based upon the wake-up RNTI used to transmit the wake-up message.

34. The UE of claim 31, wherein the RNTI is a C-RNTI.

35. The UE of claim 31, wherein the RNTI is associated with a group of UEs including the UE.

36. The UE of claim 31, the processors further configured to:
determine the presence of the message communicating the RNTI;
decode a wake-up indicator communicated within the message; and
determine that the wake-up indicator is set to a positive wake-up value for the UE.

37. The UE of claim 36, wherein the wake-up indicator set to a positive wake-up value is a downlink or uplink assignment message.

38. The UE of claim 36, wherein the processors configured to decode the wake-up indicator comprises the processors configured to:
decode the wake-up message to identify a codeword and
decode the codeword using an algorithm assigned to the UE.

* * * * *